US007940308B2

(12) United States Patent  
Suzuki et al.

(10) Patent No.: US 7,940,308 B2
(45) Date of Patent: May 10, 2011

(54) IMAGE PROCESSING SYSTEM, IMAGE PICKUP APPARATUS, IMAGE PICKUP METHOD, IMAGE REPRODUCING APPARATUS, AND IMAGE REPRODUCING METHOD

(75) Inventors: Takao Suzuki, Kanagawa (JP); Ichiro Tanji, Kanagawa (JP); Hiroshi Okawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1069 days.

(21) Appl. No.: 11/399,658

(22) Filed: Apr. 7, 2006

(65) Prior Publication Data

US 2006/0232688 A1  Oct. 19, 2006

(30) Foreign Application Priority Data

Apr. 14, 2005  (JP) .................................. 2005-117576

(51) Int. Cl.
- *H04N 5/228* (2006.01)
- *H04N 5/76* (2006.01)
- *H04N 5/262* (2006.01)
- *H04N 5/222* (2006.01)

(52) U.S. Cl. ............. 348/222.1; 348/231.99; 348/231.2; 348/231.9; 348/239; 348/333.12; 348/333.01

(58) Field of Classification Search ............... 348/222.1, 348/231.99, 231.2, 231.9, 239, 333.12
See application file for complete search history.

(56) References Cited

U.S. PATENT DOCUMENTS

| 5,625,712 | A  | * | 4/1997 | Schoenzeit et al. | 382/232 |
| 5,640,202 | A  | * | 6/1997 | Kondo et al. | 348/222.1 |
| 6,311,224 | B1 | * | 10/2001 | Packard | 709/247 |
| 6,370,198 | B1 |   | 4/2002 | Washino | |
| 6,654,498 | B2 | * | 11/2003 | Takahashi et al. | 382/232 |
| 7,821,543 | B2 | * | 10/2010 | Hayashi | 348/220.1 |
| 2002/0021364 | A1 | * | 2/2002 | Asada et al. | 348/312 |
| 2003/0016292 | A1 | * | 1/2003 | Lee et al. | 348/222.1 |
| 2003/0043142 | A1 | * | 3/2003 | Ishibashi | 345/213 |
| 2004/0240744 | A1 | * | 12/2004 | Honda et al. | 382/236 |
| 2005/0052553 | A1 | * | 3/2005 | Kido et al. | 348/296 |
| 2005/0057687 | A1 |   | 3/2005 | Irani et al. | |
| 2006/0187340 | A1 | * | 8/2006 | Hsu | 348/441 |

FOREIGN PATENT DOCUMENTS

| EP | 1 073 269 A2 | 1/2001 |
| JP | 5-328298 | 12/1993 |
| JP | 9-107516 | 4/1997 |
| JP | 10-261267 | 9/1998 |
| JP | 2000-197063 | 7/2000 |
| JP | 2000-350085 | 12/2000 |
| JP | 2001-101795 | 4/2001 |
| JP | 2005-86499 | 3/2005 |

* cited by examiner

Primary Examiner — Jason Chan
Assistant Examiner — Michael Osinski
(74) Attorney, Agent, or Firm — Oblon, Spivak, McClelland, Maier & Neustadt, L.L.P.

(57) ABSTRACT

An image processing system including: an image pickup apparatus for picking up an image of a subject; and an image reproducing apparatus for reproducing the image picked up by the image pickup apparatus; wherein the image pickup apparatus includes an image pickup unit for obtaining an image by image pickup, an image pickup rate controlling unit for controlling an image pickup rate of the image pickup unit, a line reducing unit for removing a plurality of lines from the image obtained by the image pickup, and an image storing unit for storing a reduced image in which the plurality of lines are removed on a storage medium, and the image reproducing apparatus includes an image reading unit for reading the image stored on the storage medium, an up-converter for up-converting the read image, and a reproduction displaying unit for displaying the up-converted image.

8 Claims, 23 Drawing Sheets

FIG.4
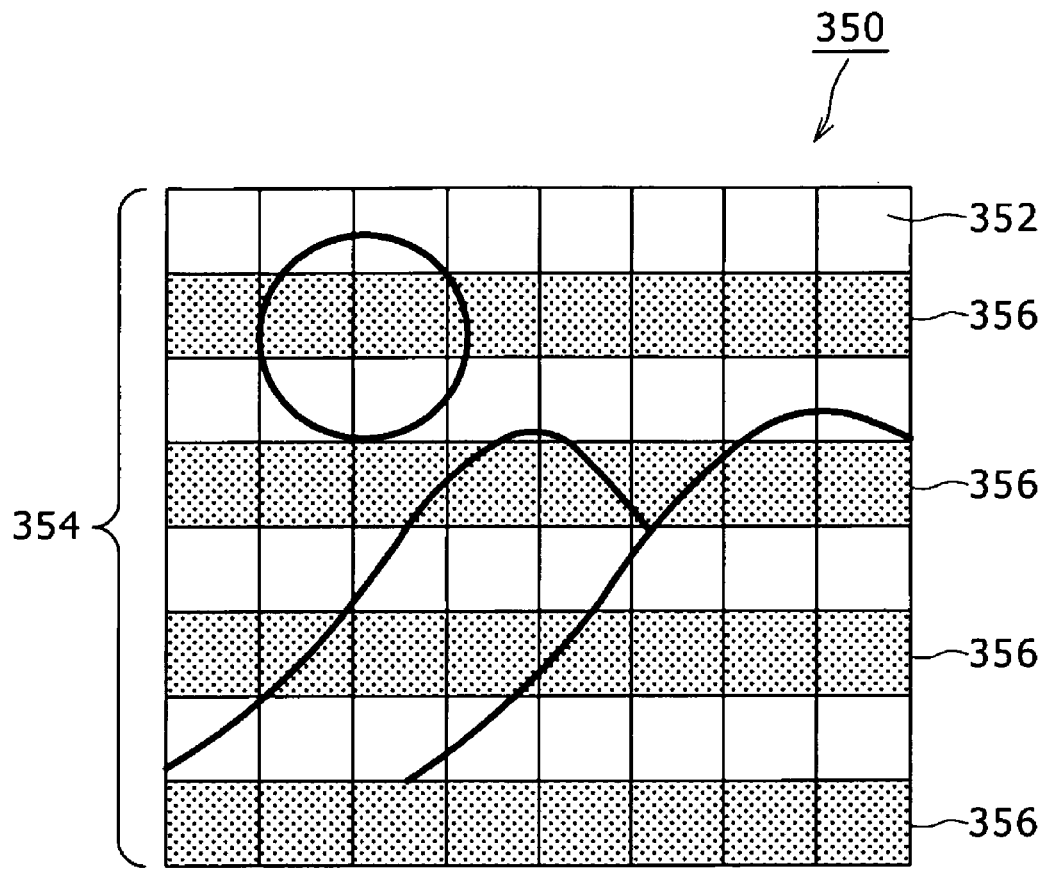
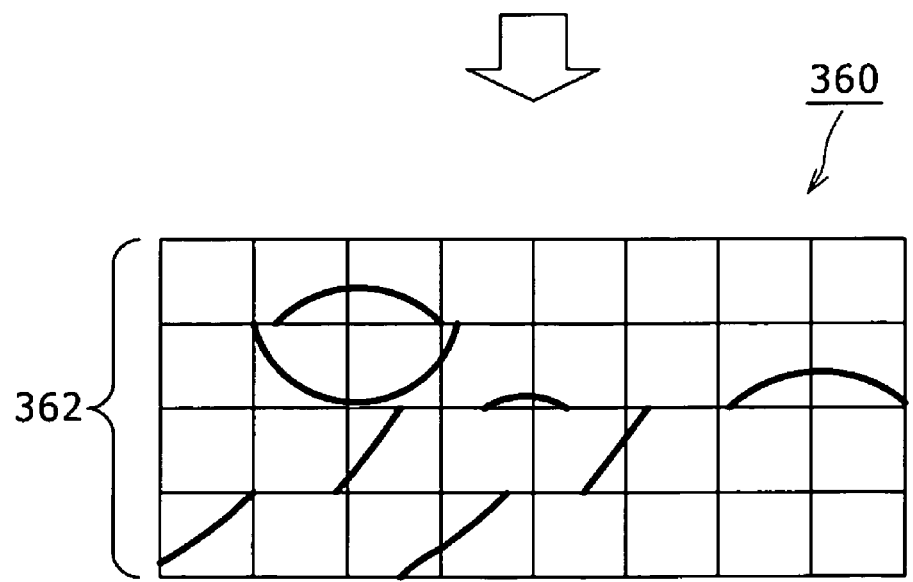

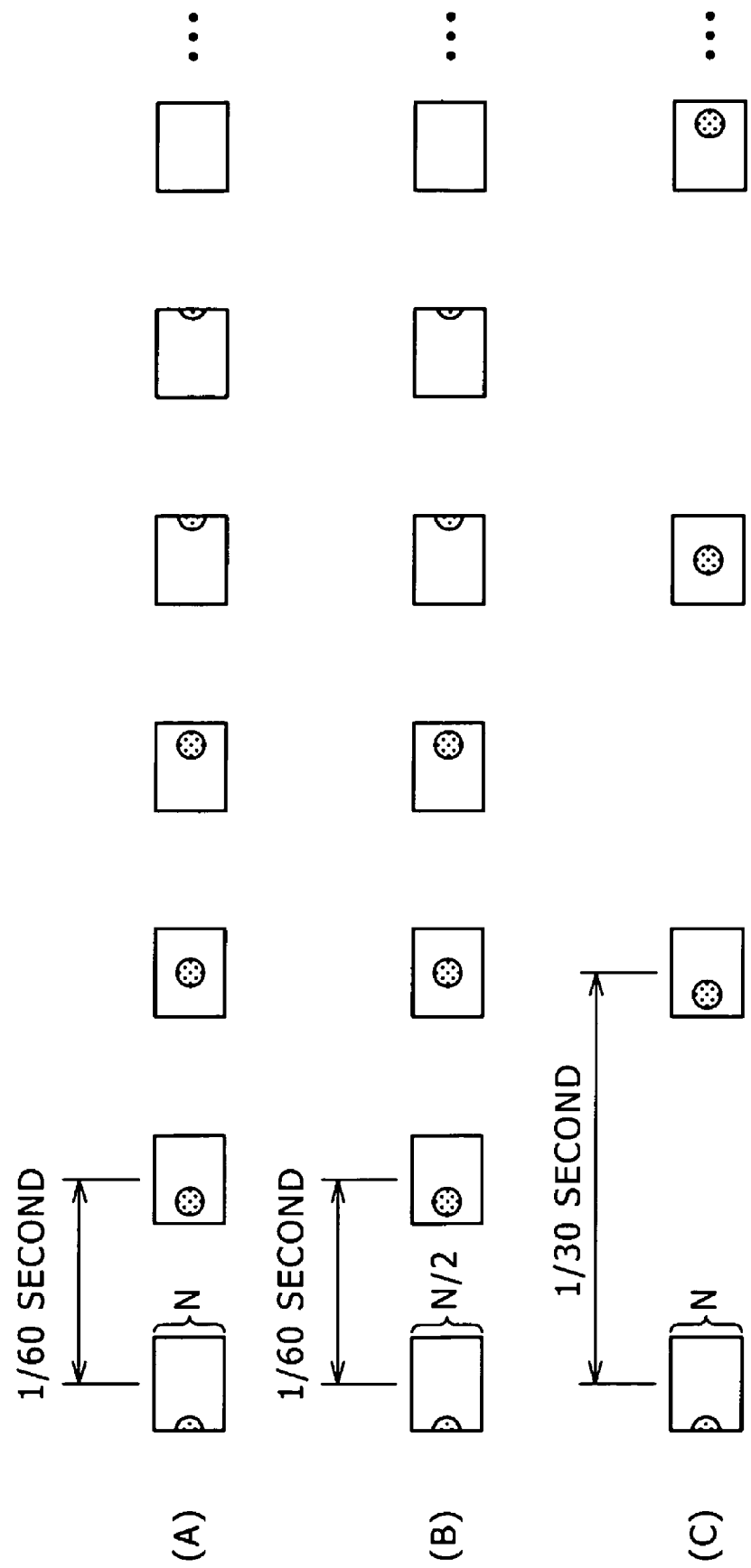

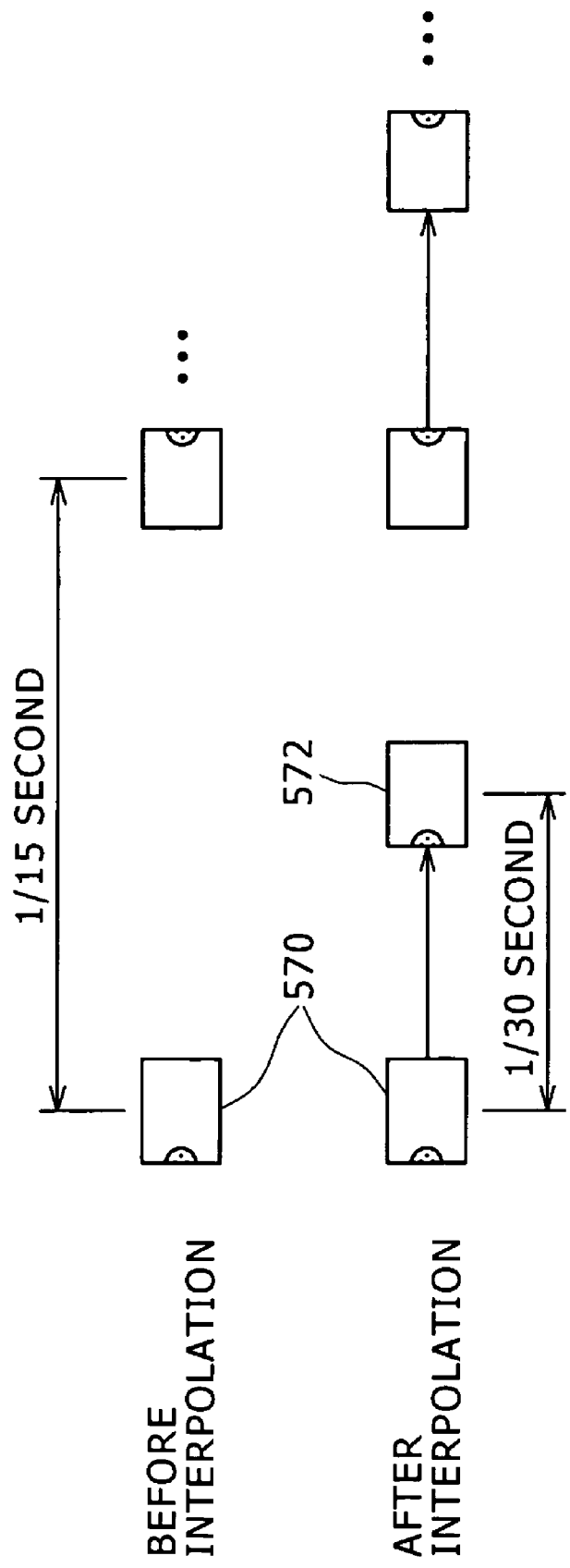

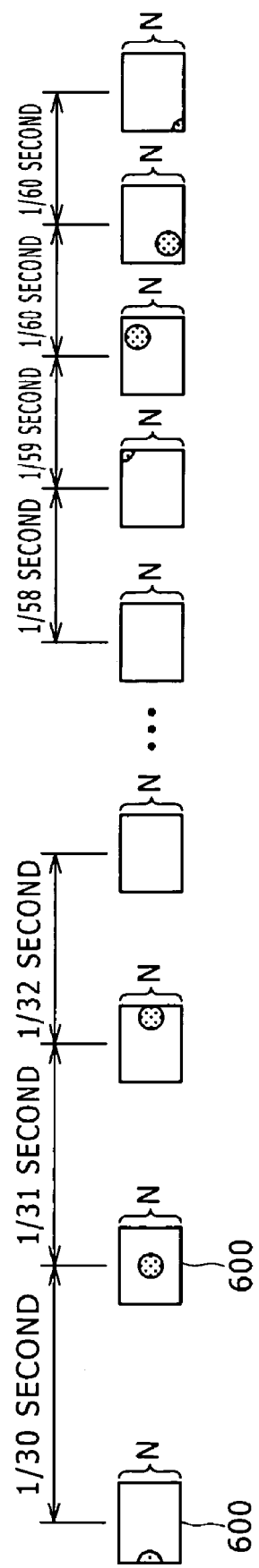

IMAGE PROCESSING SYSTEM, IMAGE PICKUP APPARATUS, IMAGE PICKUP METHOD, IMAGE REPRODUCING APPARATUS, AND IMAGE REPRODUCING METHOD

CROSS REFERENCES TO RELATED APPLICATIONS

The present invention contains subject matter related to Japanese Patent Application JP 2005-117576 filed in the Japanese Patent Office on Apr. 14, 2005, the entire contents of which being incorporated herein by reference.

BACKGROUND OF THE INVENTION

The present invention relates to an image processing system, an image pickup apparatus, an image pickup method, an image reproducing apparatus, and an image reproducing method.

Image pickup apparatus that pick up an image of a subject and store the image on a storage medium have enabled sophisticated and all-purpose image pickup because of improvements in image processing capability, for example the performance of CPUs and other devices.

For example, an image with a high resolution can be obtained by simply increasing the number of pixels in image pickup. A slow-motion image with a high time resolution can be obtained by simply increasing vertical scanning frequency or horizontal scanning frequency.

A technique (for example Japanese Patent Laid-open No. Hei 9-107516) for obtaining the latter slow-motion image by multiplying the vertical scanning frequency of each frame by an integer and thus performing high-speed image pickup with a high image pickup rate is known.

However, such a technique only performs high-speed image pickup forcefully relying on the processing capacity of an image pickup apparatus, and therefore cannot perform high-speed image pickup itself when there is some limitation to one of hardware resources, for example the frequency band of an image transfer path, the capacity of an encoder, or the capacity of a storage medium.

SUMMARY OF THE INVENTION

The present invention has been made in view of the above problems of the conventional image pickup apparatus. It is desirable to provide an image processing system, an image pickup apparatus, an image pickup method, an image reproducing apparatus, and an image reproducing method that are novel and improved and enable image pickup or reproduction with an image quality and an image pickup rate meeting the needs of a user without increasing a total processing volume of data.

The present invention is characterized by enabling image quality and image pickup rate to be adjusted without increasing a total processing volume of data even when there is some limitation to one of hardware resources, for example the frequency band of an image transfer path, the capacity of an encoder, or the capacity of a storage medium. That is, according to the needs of a user, high-speed image pickup can be achieved though image quality is somewhat sacrificed, or image quality can be enhanced in low-speed image pickup.

According to an embodiment of the present invention, there is provided an image processing system including: an image pickup apparatus for picking up an image of a subject; and an image reproducing apparatus for reproducing the image picked up by the image pickup apparatus; wherein the image pickup apparatus includes an image pickup unit for obtaining an image by image pickup, an image pickup rate controlling unit for controlling an image pickup rate of the image pickup unit, a line reducing unit for removing a plurality of lines from the image obtained by the image pickup, and an image storing unit for storing a reduced image in which the plurality of lines are removed on a storage medium, and the image reproducing apparatus includes an image reading unit for reading the image stored on the storage medium, an up-converter for up-converting the read image, and a reproduction displaying unit for displaying the up-converted image.

The image pickup rate refers to a temporal rate of image pickup, and indicates for example 1/30 of a second per image (30 p) or the like as an image sampling time for one frame. A line described above refers to a set of pixels scanned in a horizontal direction in an image. Reducing such lines lowers resolution and therefore lowers image quality. Increasing image pickup lines heightens resolution and therefore enhances image quality.

The image processing system can achieve high-speed image pickup because the image processing system can increase the image pickup rate even though the number of lines is reduced and thus image quality is somewhat sacrificed.

According to another embodiment of the present invention, there is provided an image pickup apparatus including: an image pickup unit for obtaining an image by image pickup; an image pickup rate controlling unit for controlling an image pickup rate of the image pickup unit; a line reducing unit for removing a plurality of lines from the image obtained by the image pickup; and an image storing unit for storing a reduced image in which the plurality of lines are removed on a storage medium.

As with the above-described image processing system, the image pickup apparatus can achieve high-speed image pickup because the image pickup apparatus can increase the image pickup rate even though the number of lines is reduced and thus image quality is somewhat sacrificed.

The image pickup rate controlling unit may control the image pickup rate to N/M ($N \leq M$, and N and M are an integer) times a normal image pickup rate, and the line reducing unit may remove the lines such that a number of lines per image is M/N times a normal number of lines.

Such a configuration make it possible to achieve high-speed image pickup without increasing a total processing volume of data by for example increasing the image pickup rate to twice the normal image pickup rate and reducing the number of lines to ½ of the normal number of lines. The N may be a number of lines, such for example as 1080, which lines are included in an image of one frame.

When the N is an integral multiple of M, the line reducing unit can discretely reduce the lines at equal intervals.

Under such a condition, N/M is an integer L, and it suffices to remove L−1 lines in every L lines. It is therefore possible to discretely reduce lines at equal intervals of L lines, and thus maintain uniform image quality.

The image storing unit may store numerical information of N and M on the storage medium together with the reduced image.

Such a configuration allows accurate up-conversion in an image reproducing apparatus reproducing the picked-up image even when the numerical values of N and M are changed in each image pickup. Such numerical values may be changed in the middle of image pickup. In such a case, new numerical information is stored on the storage medium in timing of the conversion of the numerical values.

The image pickup apparatus can further include an encoder for compressing the reduced image in which the plurality of lines are removed, wherein the image storing unit can store the compressed image on the storage medium.

Such a configuration allows images for a long period of time to be stored on a storage medium having a limited storage capacity.

The storage medium may be in a form of a disk, and the image storing unit may include a disk buffer for temporarily retaining the reduced image and outputting the reduced image in timing of access to the storage medium.

The disk buffer absorbs a difference between timing of writing of data to the storage medium in the disk form whose writing position or reading position is changed by rotation and timing of reception of the reduced image. The disk buffer writes the data to the storage medium in parallel with the reception of the reduced image.

According to another embodiment of the present invention, there is provided an image pickup method for performing image pickup in the image pickup apparatus, the image pickup method including: an image pickup step of obtaining an image by image pickup; a rate controlling step of controlling an image pickup rate in the image pickup step; a line reducing step of removing a plurality of lines from the image obtained by the image pickup; and an image storing step of storing a reduced image in which the plurality of lines are removed on a storage medium.

According to another embodiment of the present invention, there is provided an image pickup apparatus including: an image pickup unit for obtaining an image by image pickup; an image pickup rate controlling unit for controlling an image pickup rate of the image pickup unit; a line adding unit for adding a plurality of image pickup lines of the image pickup unit; and an image storing unit for storing an addition image to which the plurality of lines are added on a storage medium. The image pickup lines are lines of an image actually picked up by the image pickup unit. Hence, an upper limit of the number of image pickup lines is determined by the performance of the image pickup unit.

The image pickup apparatus can obtain an image of high image quality by increasing image pickup lines even though the image pickup rate is decreased and thus low-speed image pickup is performed.

The image pickup rate controlling unit may control the image pickup rate to N/M (N≦M, and N and M are an integer) times a normal image pickup rate, and the line adding unit may add image pickup lines such that a number of image pickup lines is M/N times a normal number of image pickup lines.

Such a configuration make it possible to obtain an image of high image quality without increasing a total processing volume of data by for example decreasing the image pickup rate to ½ of the normal image pickup rate and increasing the number of lines to twice the normal number of lines. The M may be a number of lines with which image pickup is possible (an upper limit value) in the image pickup unit.

The image storing unit may store numerical information of N and M on the storage medium together with the addition image.

Such a configuration allows accurate control of a reproduction rate in an image reproducing apparatus reproducing the picked-up image even when the numerical values of N and M are changed in each image pickup. Such numerical values may be changed in the middle of image pickup. In such a case, new numerical information is stored on the storage medium in timing of the conversion of the numerical values.

The image pickup apparatus can further include an encoder for compressing the addition image to which the plurality of lines are added, wherein the image storing unit can store the compressed image on the storage medium.

The storage medium may be in a form of a disk, and the image storing unit may include a disk buffer for temporarily retaining the addition image and outputting the addition image in timing of access to the storage medium.

According to another embodiment of the present invention, there is provided an image pickup method for performing image pickup in the image pickup apparatus, the image pickup method including: an image pickup step of obtaining an image by image pickup; a rate controlling step of controlling an image pickup rate in the image pickup step; a line adding step of adding a plurality of image pickup lines in the image pickup step; and an image storing step of storing an addition image to which the plurality of lines are added on a storage medium.

According to another embodiment of the present invention, there is provided an image reproducing apparatus including: an image reading unit for reading an image stored on a storage medium; an up-converter for up-converting the read image; and a reproduction displaying unit for displaying the up-converted image. The up-converter performs interpolation between pixels formed in adjacent lines by an LPF, linear interpolation or the like, and thereby adds a new line between the lines.

The image reproducing apparatus can reproduce images with a high image pickup rate even though the number of lines is reduced and image quality is somewhat sacrificed.

The up-converter may up-convert the number of lines to N/M (N≧M, and N and M are an integer) times a normal number of lines. When the N is an integral multiple of M, the up-converter can interpolate lines of the image at equal intervals.

Under such a condition, N/M is an integer L, and it suffices to interpolate L−1 lines for every single line. It is therefore possible to insert L−1 lines at equal intervals, and thus maintain uniform image quality.

The image reading unit may read numerical information of N and M from the storage medium together with the image, and transmit the numerical information of N and M to the up-converter.

Such a configuration allows accurate up-conversion even when the numerical values of N and M are changed during reproduction. Such numerical values may be changed in the middle of reproduction of the storage medium. In such a case, new numerical information is read in timing of the conversion of the numerical values.

The image reproducing apparatus can further include a decoder for decompressing the compressed image read by the image reading unit, wherein the up-converter can up-convert the decompressed image.

The storage medium is in a form of a disk whose writing position or reading position is changed by rotation, and the image reading unit may include a display buffer for temporarily retaining the image read in timing of access to the storage medium, and outputting the image to the reproduction displaying unit.

The display buffer absorbs a difference between timing of reading of data from the storage medium in the disk form and timing of outputting the data to the reproduction displaying unit. The display buffer outputs the data to the reproduction displaying unit in parallel with the reading of an image from the storage medium.

According to another embodiment of the present invention, there is provided an image reproducing method for reproducing an image in an image reproducing apparatus, the image reproducing method including: an image reading step of reading an image stored on a storage medium; an up-converter step of up-converting the read image; and a displaying step of displaying the up-converted image.

According to another embodiment of the present invention, there is provided an image reproducing apparatus including: an image reading unit for reading images stored on a storage medium; a reproduction rate controlling unit for controlling a reproduction rate by performing interpolation between the read images; and a reproduction displaying unit for displaying the images with the controlled reproduction rate. The control of the reproduction rate is generation of an image between adjacent images by an LPF, linear interpolation, simple copying or the like from the adjacent images in order to achieve a desired reproduction rate.

Even though the image pickup rate is decreased and thus dynamic characteristics are somewhat sacrificed, the image reproducing apparatus can add images and reproduce images of high image quality.

The reproduction rate controlling unit may control the reproduction rate to M/N (N≦M, and N and M are an integer) times a normal reproduction rate. When the M is an integral multiple of N, the reproduction rate controlling unit can perform the interpolation between the images at equal intervals.

Under such a condition, M/N is an integer L, and it suffices to interpolate L−1 images for one image. It is therefore possible to insert L−1 images at equal intervals, and thus maintain a uniform flow of images.

The image reading unit may read numerical information of N and M from the storage medium together with the images, and transmit the numerical information of N and M to the reproduction rate controlling unit.

The image reproducing apparatus can further include a decoder for decompressing compressed images read by the image reading unit, wherein the reproduction rate controlling unit can control the reproduction rate by performing the interpolation between the decompressed images.

The storage medium is in a form of a disk, and the image reading unit may include a display buffer for temporarily retaining an image read in timing of access to the storage medium, and outputting the image to the reproduction displaying unit.

According to another embodiment of the present invention, there is provided an image reproducing method for reproducing an image in an image reproducing apparatus, the image reproducing method including: an image reading step of reading images stored on a storage medium; a reproduction rate controlling step of controlling a reproduction rate by performing interpolation between the read images; and a displaying step of displaying the images with the controlled reproduction rate.

The image pickup apparatus and the image reproducing apparatus can be formed integrally. In addition, the image pickup apparatus intended for high-speed image pickup and the image pickup apparatus intended for high-image-quality image pickup can be formed integrally. Similarly, the image reproducing apparatus can be formed integrally. Further, constituent elements in the image pickup apparatus and the image reproducing apparatus can be formed by a plurality of devices independent of each other.

As described above, according to the present invention, it is possible to perform image pickup or reproduction with an image quality and an image pickup rate meeting the needs of a user without increasing a total processing volume of data. It is thus possible to adjust image quality or image pickup rate without increasing a total processing volume of data to be processed even when there is some limitation to hardware resources. According to the needs of a user, high-speed image pickup can be achieved though image quality is somewhat sacrificed, or images of high image quality can be obtained in low-speed image pickup.

BRIEF DESCRIPTION OF THE DRAWINGS

FIG. 4 is an explanatory diagram of assistance in explaining the operation of a line reducing unit;

FIG. 7C is an explanatory diagram of assistance in explaining high-speed image pickup in the second embodiment;

FIG. 10 is an explanatory diagram of assistance in explaining the operation of a reproduction rate controlling unit;

FIG. 12 is a time chart of assistance in explaining image pickup when an image pickup rate is gradually increased;

DETAILED DESCRIPTION OF THE PREFERRED EMBODIMENTS

Figure 1:
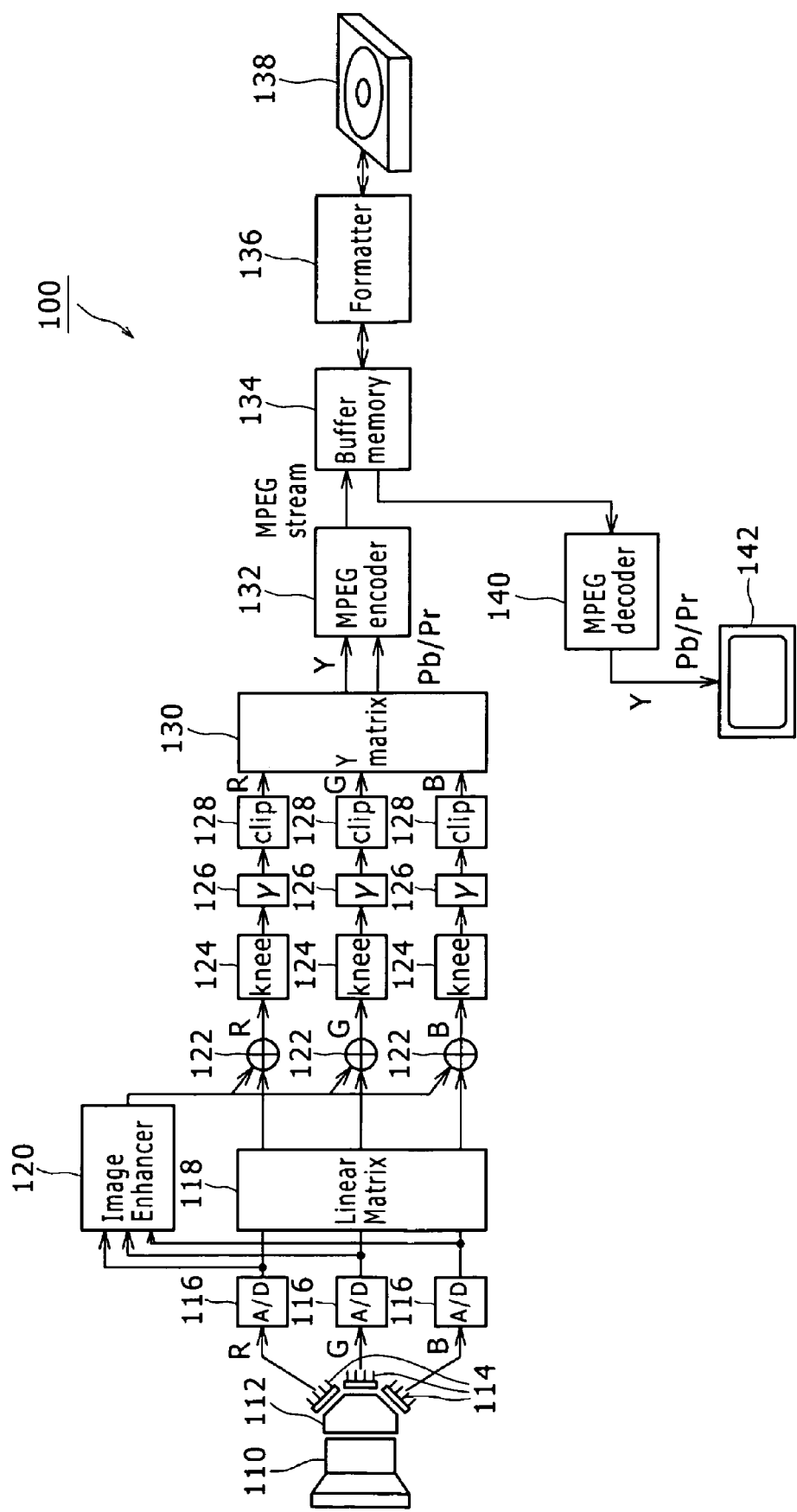
FIG. 1 is a block diagram schematically showing an image pickup apparatus according to a first embodiment.

Preferred embodiments of the present invention will hereinafter be described in detail with reference to the accompanying drawings. Incidentally, components having substantially the same function and configuration in the present specification and the drawings are identified by the same reference numerals, and repeated description thereof will be omitted.

First Embodiment

Image Pickup Apparatus

Detailed description will first be made of an image pickup apparatus to which the present invention can be applied. It is to be noted that while the description will be made by taking an example of a video camera capable of color pickup of a still image and/or a moving image as the image pickup apparatus according to the present embodiment, the present invention is not limited to the embodiment.

FIG. 1 is a block diagram schematically showing the image pickup apparatus 100 according to the first embodiment. The image pickup apparatus 100 includes a lens part 110, a prism part 112, CCD units 114, A/D converter units 116, a linear matrix circuit 118, an image enhancing unit 120, adders 122, knee circuits 124, gamma circuits 126, clipping circuits 128, a Y matrix circuit 130, an MPEG encoder 132, a buffer memory 134, a formatter 136, a disk unit 138, an MPEG decoder 140, and a reproduction displaying unit 142.

The lens part 110 includes optical parts that form an optical image of a subject on a photosensitive surface of an image pickup device. In the image pickup apparatus 100, light from the subject enters the lens part 110. The light is output to the prism part 112 through an optical low-pass filter (LPF), an infrared blocking filter, and a color filter (none are shown in the figure), for example. In addition, a microcontroller (not shown) controls a diaphragm of the lens part 110 to adjust the quantity of the incident light.

The prism part 112 is formed by a triangular prism glass, for example. The prism part 112 disperses the incident light incident on the lens into monochromatic light of each wavelength. This monochromatic light cannot be dispersed into more pieces of light even if another prism part 112 is used. In this case, the incident light is dispersed into three primary colors of light, such as red, green, and blue, in particular. After passage through the prism part 112, each color signal may be subjected to DC clamping and gain adjustment.

The CCD units 114 are an image pickup device for converting the optical image formed by the lens part 110 into an electric signal. The CCD units 114 are driven by a timing generator (not shown). The CCD units 114 read an image signal as an electric signal resulting from photoelectric conversion as required. The shutter speed of the timing generator is controlled by the above-described microcontroller. In the present embodiment, each of the three primary colors dispersed by the prism part 112 is provided with a CCD unit 114, and photoelectric conversion is performed on each of the primary colors.

The lens part 110, the prism part 112, and the CCD units 114 function as an image pickup part in the present embodiment. However, the image pickup part is not limited to such a configuration; for example, a complementary-color single-plate CCD may be used as an image pickup device, or a CMOS may be used.

The A/D (analog/digital) converter units 116 convert the analog electric signals obtained by the CCD units 114 into digital signals to be subjected to digital processing, and transmit the converted digital signals to a circuit in a succeeding stage.

The linear matrix circuit 118 corrects color signal leakage after the dispersion into the three primary colors of the optical system obtained from the A/D converter units 116 by a matrix operation in a linear region.

The image enhancing unit 120 enhances fine parts of the three primary colors of the optical system obtained in a stage preceding the linear matrix circuit 118, that is, obtained from the A/D converter units 116, and thereby generates a detail signal for each color signal.

The adders 122 add together the color signals from the linear matrix circuit 118 and the detail signals from the image enhancing unit 120, and transmit the results to circuits in a succeeding stage.

The knee circuits 124 compress a high-luminance region using characteristics of a knee curve in order to enhance reproducibility of the high-luminance region in final video display. With such a knee curve, conversion that limits the signal level of the high-luminance region is performed, whereby reproducibility in the high-luminance region of video is secured.

The gamma circuits 126 prevent a change in video on a video reproducing and displaying unit such as a cathode-ray tube monitor or the like due to inverse gamma characteristics by using gamma characteristics to thereby achieve final linear video display. With a gamma curve having the gamma characteristics, conversion that amplifies the signal level of an arbitrary region nonlinearly is performed.

The clipping circuits 128 cut off the signal level of a region that cannot be handled or is ignored in a circuit in a succeeding stage. The above-mentioned region is a signal in a range higher than a maximum value or lower than a minimum value of signal levels that can be handled. The above-mentioned cutoff can be achieved by a band-pass filter (BPF), for example.

The Y matrix circuit 130 generates a Y (luminance) signal from the three color signals passed through the clipping circuits 128. At this time, the Y matrix circuit 130 may simultaneously generate a Pb/Pr (color difference) signal.

The MPEG encoder 132 is one of encoders that compress an image. The MPEG encoder 132 receives the Y signal and the Pb/Pr signal generated by the Y matrix circuit 130, and performs an MPEG encoding process as means for compressing an amount of information, thereby generating one MPEG stream signal.

The buffer memory 134 is formed by a static memory such as an SRAM, a DRAM, a DPRAM, an EEPROM or the like. The buffer memory 134 temporarily retains the MPEG stream signal generated by the MPEG encoder 132.

The formatter 136 converts the MPEG stream signal retained in the buffer memory 134 to a format for storing the MPEG stream signal on a storage medium in the form of a disk housed in the disk unit 138. The formatter 136 outputs the MPEG stream signal after the conversion to the disk unit 138 according to access timing of the disk unit 138.

The disk unit 138 rotatably supports the storage medium in the form of a disk that changes a storage position by rotation, or a disk such for example as an optical disk, a magnetic disk, or a Blu-ray disk. The disk unit 138 writes and/or reads MPEG stream signals formatted by the formatter 136 on the storage medium.

The MPEG decoder 140 reads an MPEG stream signal stored on the storage medium of the disk unit 138 in access timing of the disk unit 138, converts the format of the MPEG stream signal, generates a Y signal and a Pb/Pr signal from a signal obtained by the format conversion, and then transmits the Y signal and the Pb/Pr signal to the reproduction displaying unit 142.

The reproduction displaying unit 142 can be formed by a liquid crystal display device or the like. The reproduction displaying unit 142 can display (reproduce) an image stored on the storage medium on the basis of the Y signal and the Pb/Pr signal received from the MPEG decoder 140.

The above-described image pickup apparatus implements basic functions for carrying out the present invention. Concrete functions of embodiments according to the present invention will be described below.

As one method of image pickup by the above-described image pickup apparatus 100, it is possible to perform high-speed image pickup by simply increasing vertical scanning frequency or horizontal scanning frequency, and obtain an image as in slow motion while maintaining image quality. The slow-motion image is for example used for a moment of reaching a goal in a footrace, or obtaining the trajectory of a thrown ball.

Figure 2A:
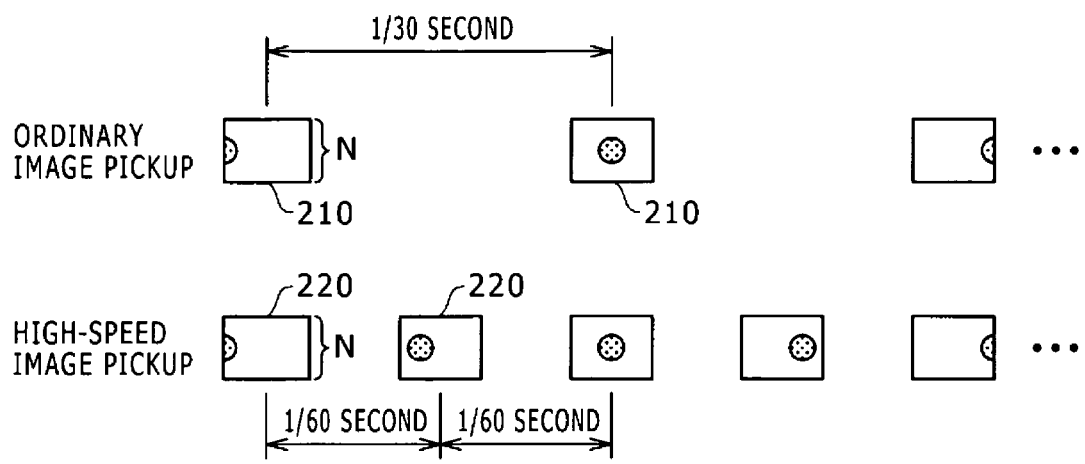
FIG. 2A is a time chart of assistance in explaining high-speed image pickup.
Figure 2B:
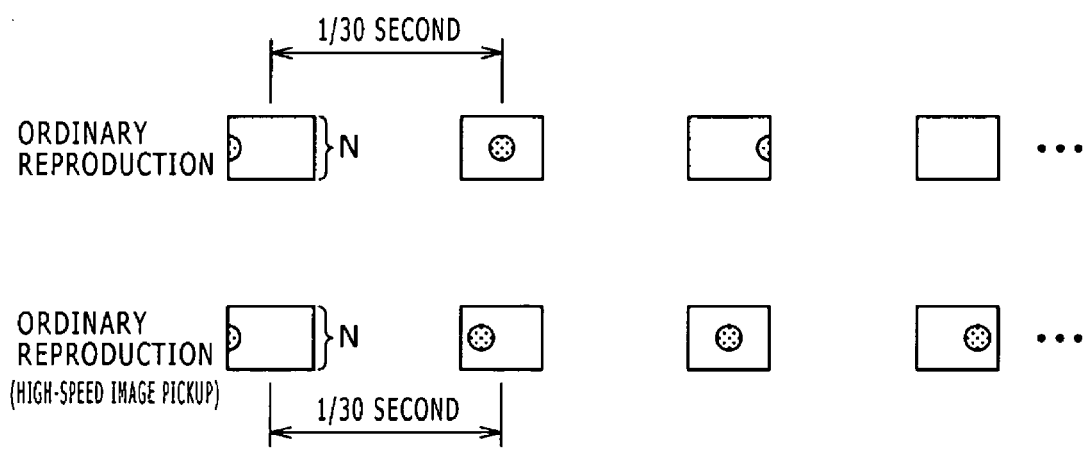
FIG. 2B is a time chart of assistance in explaining high-speed image pickup.

FIGS. 2A and 2B are time charts of assistance in explaining high-speed image pickup. The passage of time in the time charts is represented by a time axis extending from the left to the right of the figures. In the figures, N denotes the number of lines.

An upper side of FIG. 2A shows relation between images picked up in ordinary image pickup and time. Specifically, in ordinary image pickup, for example, an image of a subject is captured every 1/30 of a second, and the image is sequentially stored as image data on a magnetic tape, an optical disk, or a magnetic disk. Hence, in a case where an image of a ball having a highly dynamic characteristic, for example a ball flying from the left to the right of a screen is picked up, a difference between images 210 of adjacent frames is large, that is, the position of the ball is greatly shifted between the images 210.

A lower side of FIG. 2A shows relation between images picked up in high-speed image pickup and time. Specifically, in high-speed image pickup, an image of a subject is captured at an image pickup rate higher than that of the ordinary image pickup, for example every 1/60 of a second, and the image is sequentially stored as image data on a magnetic tape, an optical disk, or a magnetic disk. This high-speed image pickup can capture more detailed positional displacements between images 220 of frames than in ordinary image pickup even in a case where an image of a ball having a highly dynamic characteristic, for example a flying ball as described above is picked up.

FIG. 2B shows relation between time and reproduced images, which images are picked up in ordinary image pickup and high-speed image pickup described with reference to FIG. 2A. An upper side of FIG. 2B shows ordinary reproduction of images obtained by ordinary image pickup. In this case, an image of a subject captured every 1/30 of a second in ordinary image pickup is read and reproduced from a magnetic tape, an optical disk, or a magnetic disk in the same timing of every 1/30 of a second. The ordinary reproduction of the images obtained by the ordinary image pickup is a reproduction based on natural time, and with images of a violent movement, information between the images is lost.

In the reproduction of high-speed image pickup shown in a lower side of FIG. 2B, images picked up every 1/60 of a second are reproduced every 1/30 of a second. Therefore a flow of time is twice the natural time, which represents a slow motion, and smaller changes of smoother movement than in the reproduction of ordinary image pickup can be perceived. This slow-motion image can be achieved by simple frame advance of images obtained by ordinary image pickup; however, a total number of images being equal, smooth and small changes cannot be perceived. While ordinary image pickup is performed every 1/30 of a second (30 p) and high-speed image pickup is performed every 1/60 of a second (60 p) in this case, the ordinary image pickup and the high-speed image pickup are not limited to such a case, and various sampling times are applicable within a range that the image processing of the image pickup apparatus permits.

While the above-described high-speed image pickup is effective in capturing the movement of a subject that varies in position relatively greatly, a load on the image processing of the image pickup apparatus increases simply by an amount corresponding to the increase in speed (double speed in the above example). Hence, when there is some limitation to one of hardware resources, for example the frequency band of an image transfer path, the capacity of the encoder, or the capacity of the storage medium, the high-speed image pickup itself cannot be performed.

The present embodiment is characterized by adjusting image quality or an image pickup rate without increasing a total processing volume of data to be processed even when there is some limitation to such hardware resources. That is, according to the needs of a user, it is possible (1) to achieve high-speed image pickup though image quality is somewhat sacrificed, or (2) to obtain images of high image quality in low-speed image pickup.

Description in the following will be made of a case (1) where high-speed image pickup is achieved though image quality is somewhat sacrificed in an image processing system according to a second embodiment, and a case (2) where images of high image quality are obtained in low-speed image pickup in an image processing system according to a third embodiment. In the description, N, M, and L are an integer, and for example N/M includes a reduced value.

Second Embodiment

Image Processing System

Image Pickup Apparatus 300

Figure 3:
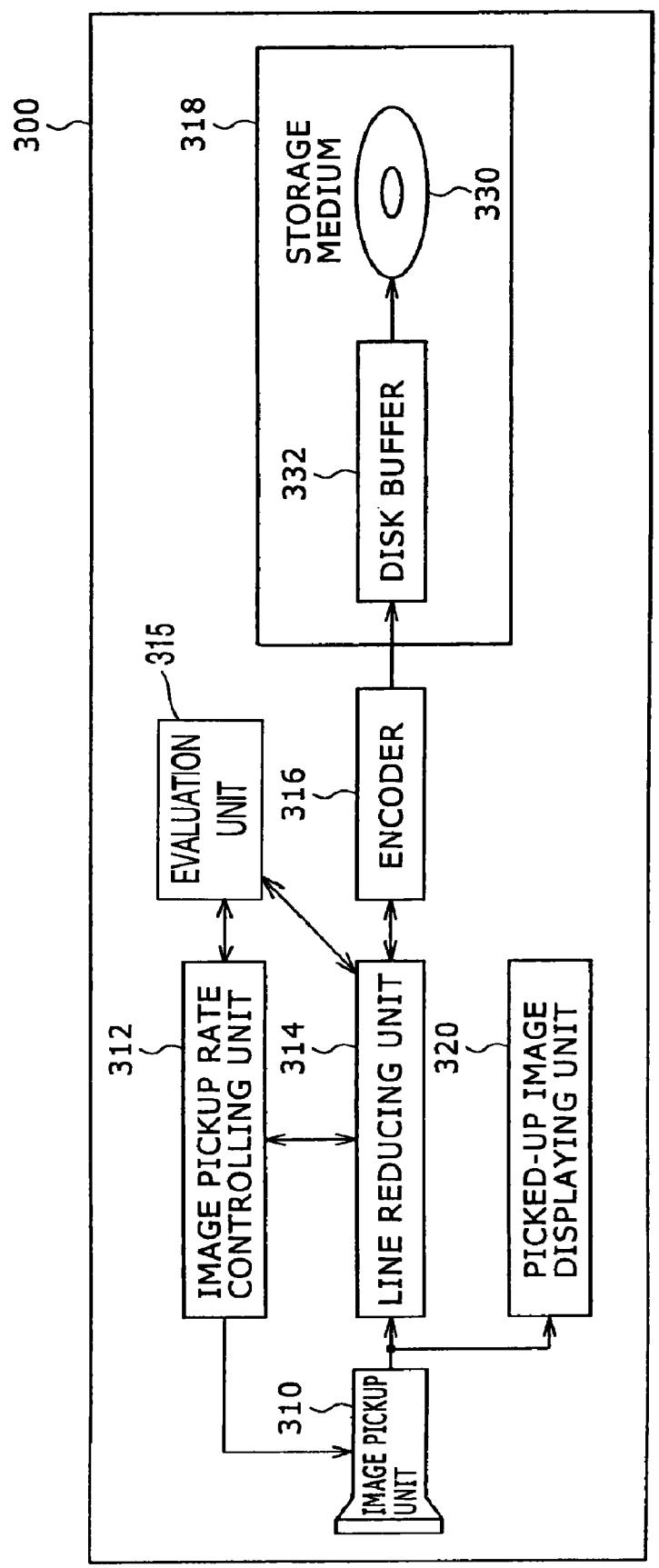
FIG. 3 is a block diagram schematically showing an image pickup apparatus according to a second embodiment.

FIG. 3 is a block diagram schematically showing an image pickup apparatus 300 according to the second embodiment. The image pickup apparatus 300 includes an image pickup unit 310, an image pickup rate controlling unit 312, a line reducing unit 314, an evaluation unit 315, an encoder 316, an image storing unit 318, and a picked-up image displaying unit 320.

The image pickup unit 310 includes for example the lens part 110, the prism part 112, and the CCD units 114 described in the first embodiment. The image pickup unit 310 obtains a picture by picking up an image of a subject. The picked-up image is transferred serially in pixel units. In addition, as required, the image pickup unit 310 can include the A/D converter units, the linear matrix circuit, the image enhancing unit, the adders, the knee circuits, the gamma circuits, the clipping circuits, the Y matrix circuit and the like described in the first embodiment.

The image pickup rate controlling unit 312 transmits an image pickup rate signal to the image pickup unit 310 to adjust an image pickup rate. The image pickup rate controlling unit 312 controls the subject image pickup rate to N/M times a normal image pickup rate. At this time, a relation $N \geq M$ holds. Even when the image pickup rate is increased to N/M times the normal image pickup rate, a total processing volume of data is not changed because the line reducing unit 314 to be described later reduces the number of lines per image to M/N times a normal number of lines.

The line reducing unit 314 reduces a plurality of lines from the image picked up by the image pickup unit 310. For example, when the image pickup rate controlling unit 312 sets the image pickup rate to N/M times the normal image pickup rate, the line reducing unit 314 may reduce lines so that the number of lines per image becomes M/N times the normal number of lines. For example, supposing that N is 1080 as a number of lines included in one frame image, and that the image pickup rate is increased twice, the number of lines is reduced to ½ (540/1080) times the normal number of lines, that is, to 540. It is consequently possible to achieve high-speed image pickup while maintaining the total processing volume of data.

When N is thus an integral multiple of M, for example when N is 1080 and M is 540, the line reducing unit 314 can discretely reduce lines included in one frame at equal intervals. Under such a condition, N/M is an integer L, and it suffices to remove L−1 lines in every L lines. It is therefore possible to discretely reduce lines at equal intervals of L lines, and thus maintain uniform image quality. For example, when N is 1080 and M is 540, the line reducing unit 314 can delete every second line.

FIG. 4 is a diagram of assistance in explaining the operation of the line reducing unit 314. Description in the following will be made using a one-frame image of eight lines×eight pixels in order to facilitate understanding. Of course, the present embodiment is not limited to such a number of lines and such a number of pixels.

In a one-frame image 350 on an upper side of FIG. 4, eight pixels 352 are formed in one line, and eight such lines 354 are provided. Hence, a total number of pixels is 8×8=64. The line reducing unit 314 reduces such lines to ½. Since N in the above description is an integral multiple of M (N is twice M), lines are reduced discretely at equal intervals with one line deleted in every two lines. Thus, a plurality of lines 356 represented by dots are removed, so that the image 350 is converted into an image 360 shown on a lower side of FIG. 4. In the image 360, the number of lines 362 is four, so that a total number of pixels is 32 and the data volume of the image as a whole is reduced to ½.

The encoder 316 compresses the reduced image in which the plurality of lines are removed by the line reducing unit 314. Such a reduced image is processed after data transmitted serially in pixel units is assembled into a frame unit. Such a compression process enables images for a long period of time to be stored on a storage medium having a limited storage capacity. Such a compression process can use various conventionally known compression methods, such as MPEG, JPEG, GIF or the like.

The image storing unit 318 stores the reduced image compressed by the encoder 316 on an externally inserted or existing storage medium 330. The storage medium 330 may be in the form of a disk in which a write position or a read position is changed by rotation, and the image storing unit 318 can include a disk buffer 332 that temporarily retains the reduced image and outputs the reduced image in timing of access (writing or reading) to the storage medium 330.

The disk buffer 332 absorbs a difference between timing of writing of data to the storage medium 330 and timing of reception of the reduced image (for example a difference in transfer rate or transfer protocol), and writes data to the storage medium 330 in parallel with the reception of the reduced image. For example, while image data is transmitted from the encoder 316 in substantially constant cycles, the image storing unit 318 cannot receive the image data in constant cycles because of rotation of a disk as the storage medium 330, the movement of a pickup, and the like. Accordingly, the disk buffer 332 sequentially retains the image data transmitted in the constant cycles, and discharges the retained data according to access timing of the disk unit.

The image storing unit 318 may store the numerical information of N and M on the storage medium 330 together with the reduced image. Such numerical information stored together with the image allows accurate up-conversion in an image reproducing apparatus 400 reproducing the picked-up image even when the numerical values of N and M are changed in each image pickup.

The picked-up image displaying unit 320 directly displays an image being picked up by the image pickup unit 310 on a display device such as a liquid crystal display or the like for the image being picked up by the image pickup unit 310 to be checked. Bringing a subject into focus, exposure adjustment and the like can also be performed on the picked-up image displaying unit 320.

The image pickup apparatus 300 can increase the image pickup rate though the number of lines is reduced and thus image quality is somewhat sacrificed, and thereby achieve high-speed image pickup.

The storage medium 330 on which the above-described image pickup apparatus 300 stores the image is reproduced by an image reproducing apparatus 400 to be shown in the following.

(Image Reproducing Apparatus 400)

Figure 5:
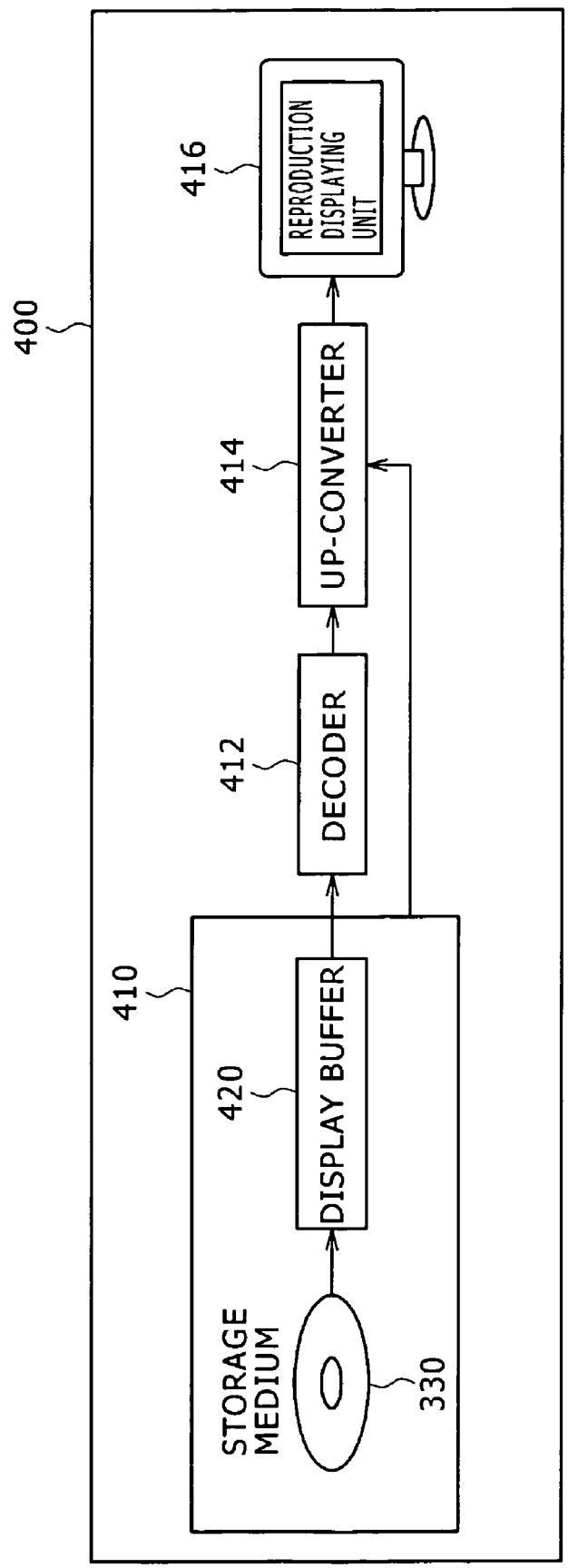
FIG. 5 is a block diagram schematically showing an image reproducing apparatus according to the second embodiment.

FIG. 5 is a block diagram schematically showing the image reproducing apparatus 400 in the second embodiment. The image reproducing apparatus 400 includes an image reading unit 410, a decoder 412, an up-converter 414, and a reproduction displaying unit 416.

The image reading unit 410 reads an image stored on the storage medium 330 written by the image pickup apparatus 300 or another storage medium. The image reading unit 410 may read the numerical information of N and M together with the image from the storage medium 330 and transmit the numerical information of N and M to the up-converter 414 to be described later. Such numerical information transmitted to the up-converter 414 enables accurate up-conversion even when the numerical values of N and M are changed during reproduction of the reproduction displaying unit 416. Such numerical values may be changed in the middle of reproduction of the storage medium 330. In such a case, new numerical information is read in timing of the numerical value conversion.

The image reading unit 410 may include a display buffer 420 that temporarily retains an image read in time of access to the storage medium 330 and outputs the image to the reproduction displaying unit 416. Such a display buffer 420 absorbs a difference between timing of reading of data from the storage medium 330 in the form of a disk and timing of outputting of the data to the reproduction displaying unit 416, and outputs the data to the reproduction displaying unit 416 in parallel with the reading of an image from the storage medium 330.

The decoder 412 decompresses a compressed image read by the image reading unit 410.

The up-converter 414 up-converts the image read by the image reading unit 410 or the image decompressed by the decoder 412. Since the above-described image pickup apparatus 300 increases the image pickup rate and reduces the number of lines of the image, lines in the image are missing. The up-converter 414 adds the missing lines by performing interpolation between pixels formed in adjacent lines by an LPF, linear interpolation or the like. Such an up-converter process can be achieved by using various conventionally known methods, and therefore description thereof will be omitted.

The up-converter 414 may up-convert the number of lines to N/M times (N≧M) the number. When the above N is an integral multiple of M, the up-converter 414 can interpolate the lines in the image at equal intervals. Under such a condition, N/M is an integer L, and it suffices to interpolate L−1 lines for each line. It is therefore possible to insert L−1 lines at equal intervals, and thus maintain uniform image quality.

Figure 6:
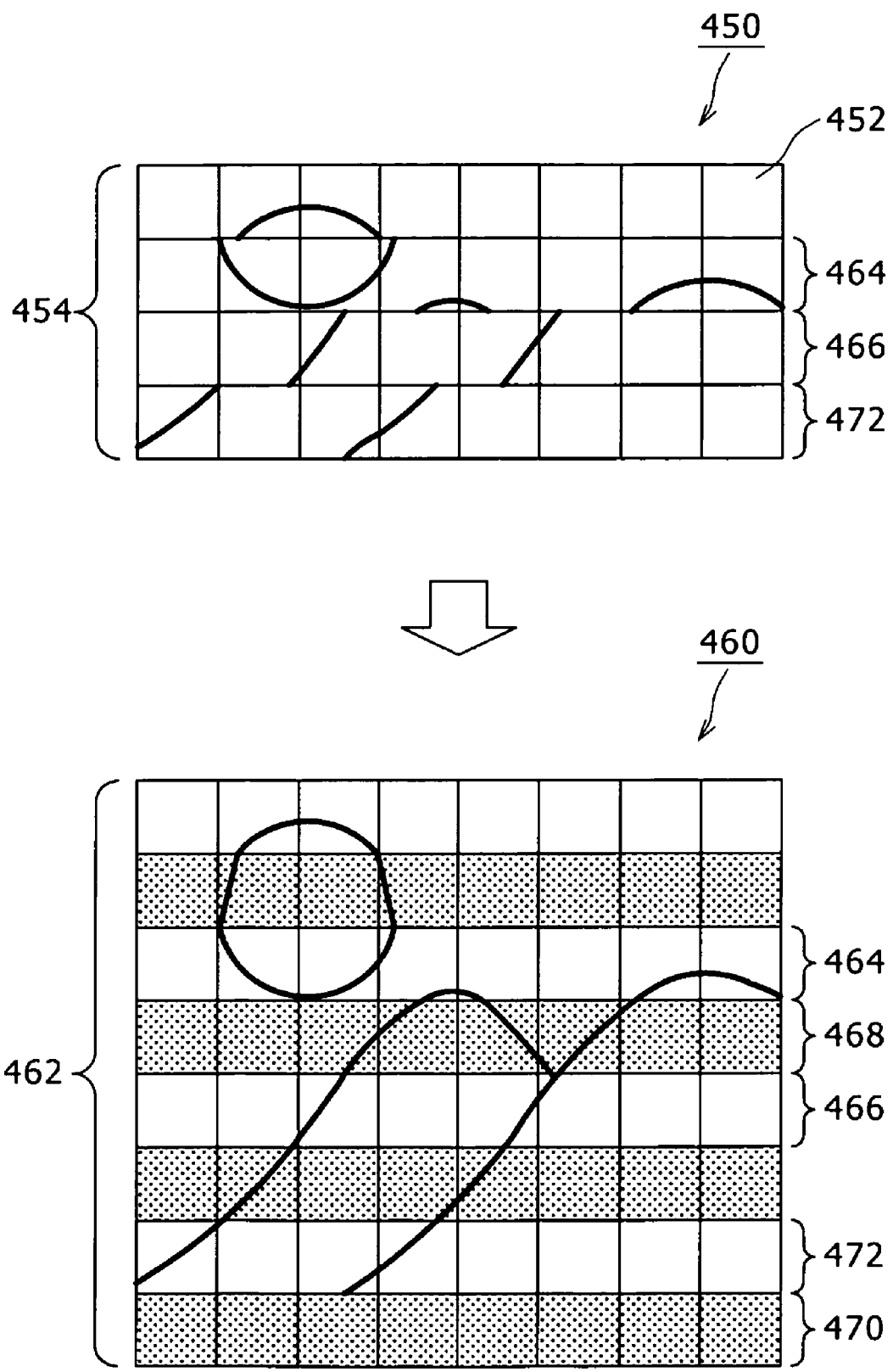
FIG. 6 is an explanatory diagram of assistance in explaining the operation of an up-converter.

FIG. 6 is a diagram of assistance in explaining the operation of the up-converter 414. Description in the following will be made using a one-frame image of four lines×eight pixels in order to facilitate understanding. Of course, the present embodiment is not limited to such a number of lines and such a number of pixels.

In a one-frame image 450 on an upper side of FIG. 6, eight pixels 452 are formed in one line, and four such lines 454 are provided. Hence, a total number of pixels is 8×4=32. The up-converter 414 up-converts such lines to twice the number of such lines. Since N in the above description is an integral multiple of M (N is twice M), one line is interpolated for each line at equal intervals.

Thus, the image 450 is converted into an image 460 shown on a lower side of FIG. 6. In the image 460, a line 468 represented by dots is interpolated between a line 464 and a line 466. Only a line 470 added at a line end part is formed from one line 472. Thus, the number of lines 462 of the image 460 is eight, so that a total number of pixels is 64 and the data volume of the image as a whole is increased twice. Hence, reproduced images obtained by high-speed image pickup can be viewed with image quality close to desired image quality.

The reproduction displaying unit 416 displays the image up-converted by the up-converter 414 on a display device such as a liquid crystal display or the like. At this time, the reproduction displaying unit 416 may also display a time of pickup of the image being reproduced, a present time, and a time bar. It is thus possible to grasp intuitively when the image being displayed was picked up.

The above-described image reproducing apparatus 400 can reproduce images at a high image pickup rate though the number of lines is reduced and therefore image quality is somewhat sacrificed.

(Image Processing System)

Figure 7A:
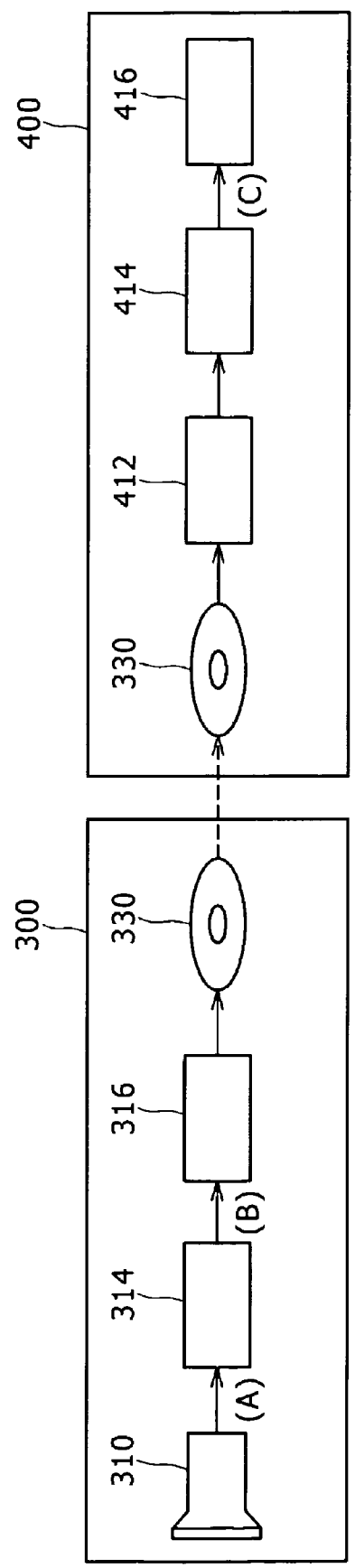
FIG. 7A is an explanatory diagram of assistance in explaining high-speed image pickup in the second embodiment.
Figure 7B:
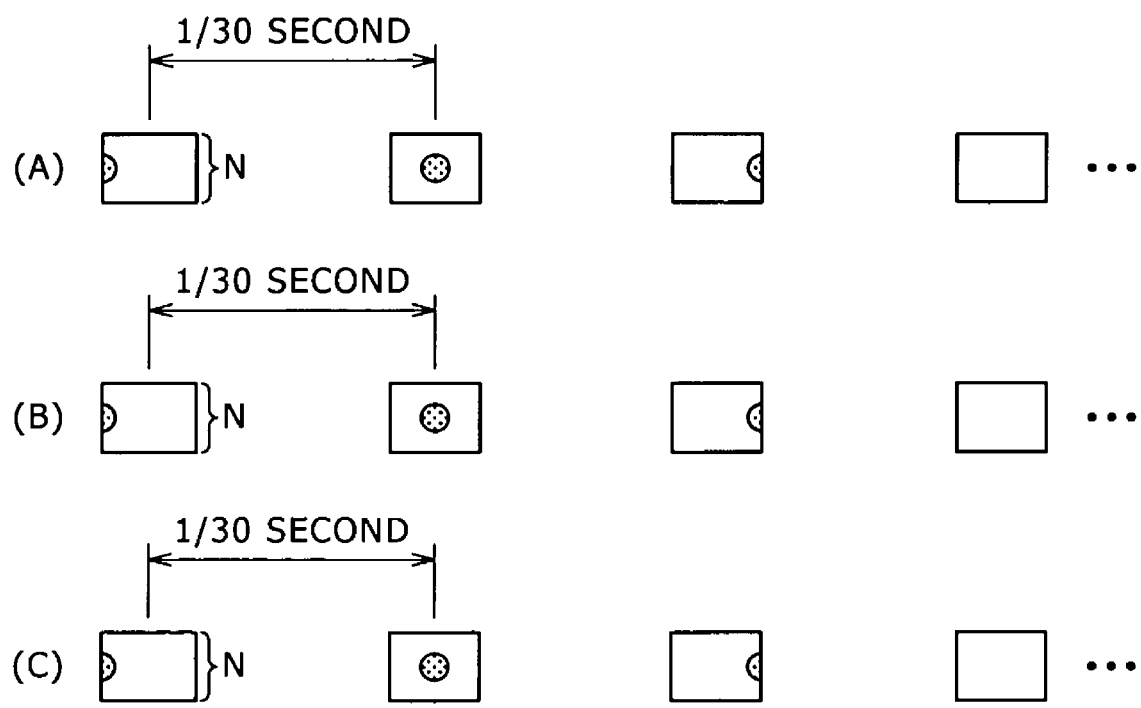
FIG. 7B is an explanatory diagram of assistance in explaining high-speed image pickup in the second embodiment.

FIGS. 7A, 7B, and 7C are diagrams of assistance in explaining high-speed image pickup in the present embodiment. FIGS. 7B and 7C, in particular, are time charts, in which a time axis extending from the left to the right of the figures represents the passage of time.

FIG. 7A is a block diagram showing the positions of check points of assistance in explaining high-speed image pickup. FIG. 7A shows point (A) at the image pickup unit 310 in the image pickup apparatus 300, point (B) at the line reducing unit 314, and point (C) at the up-converter 414 in the image reproducing apparatus 400. That is, an image being picked up is at point (A), an image whose lines are reduced is at point (B), and an up-converted final image is at point (C).

FIG. 7B is a time chart of normal image pickup for comparison with high-speed image pickup. In this case, an image pickup rate is set at a normal rate of 1/30 of a second per image, and line reduction by the line reducing unit 314 and up-conversion by the up-converter 414 are not performed. Hence, the same image transitions are obtained at all of points (A), (B), and (C) in FIG. 7B. In the figure, N denotes the number of lines. The number of lines does not change in FIG. 7B.

FIG. 7C is a time chart when high-speed image pickup is performed in the present embodiment. In this case, the image pickup rate controlling unit 312 sets the image pickup rate to twice the normal image pickup rate, that is, a rate of 1/60 of a second per image. Hence, the number of images picked up with a normal number N of lines in a unit time is twice that at point (A) of FIG. 7B. A total processing volume of data as it is simply doubled. Accordingly the line reducing unit 314 reduces the lines to N/2. Hence, at point (B), there are images with N/2 lines the number of which images is twice the number of normally picked-up images. A comparison between point (B) in FIG. 7B and point (B) in FIG. 7C indicates that although the image pickup rate is increased at point (B) in FIG. 7C, the total processing volume of data is the same.

Next, such images picked up at high speed are up-converted, so that images with a number N of lines are re-formed at point (C) in FIG. 7C. Then, the images are reproduced at the normal reproduction rate of 1/30 of a second per image. Thus, the image reproducing apparatus 400 can reproduce the images as in slow motion with a slightly lower image quality.

Third Embodiment

Image Processing System

Description will next be made of an image processing system when images of high image quality are obtained in low-speed image pickup.

(Image Pickup Apparatus 500)

Figure 8:
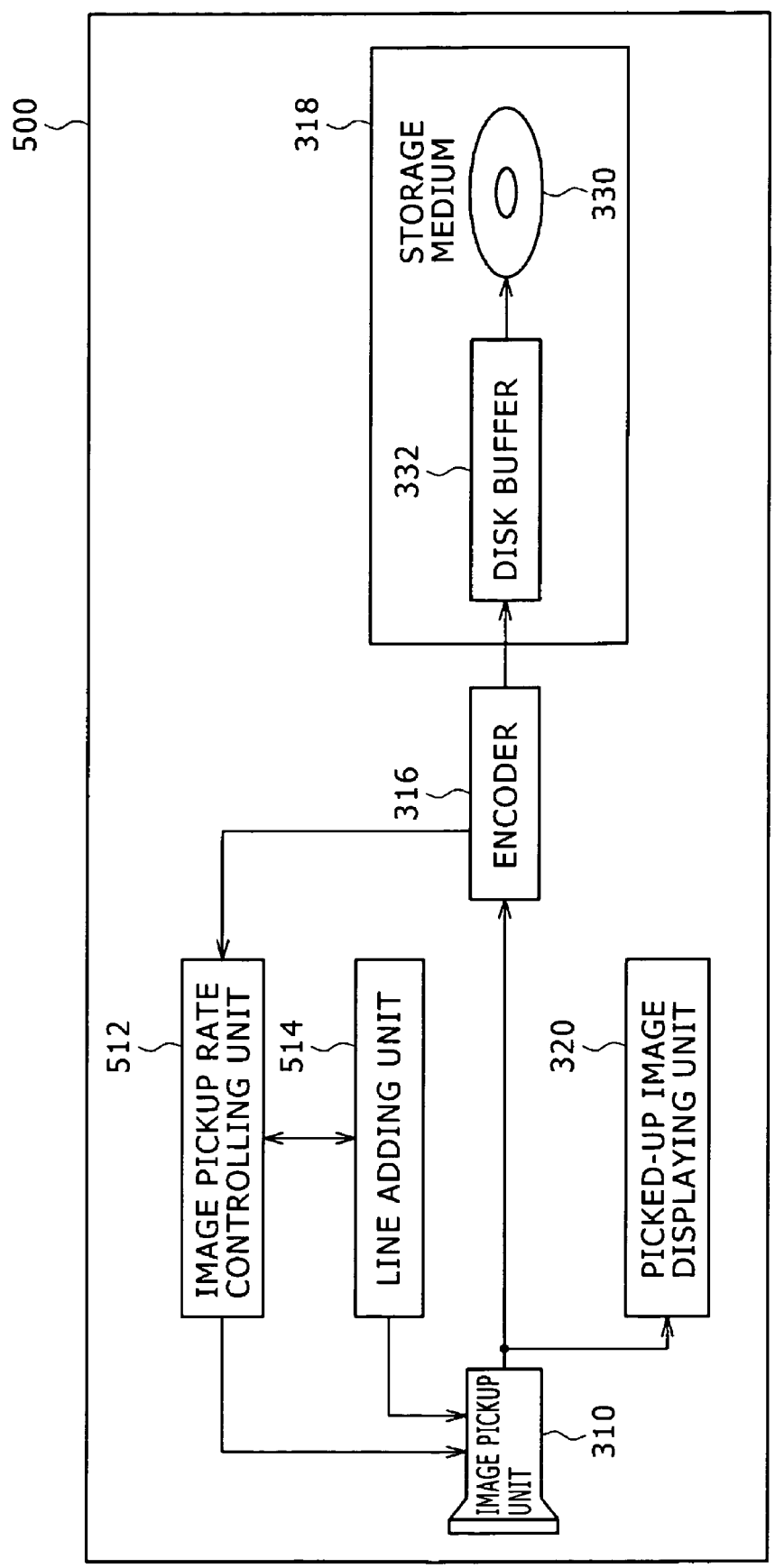
FIG. 8 is a block diagram schematically showing an image pickup apparatus according to a third embodiment.

FIG. 8 is a block diagram schematically showing an image pickup apparatus 500 according to a third embodiment. The image pickup apparatus 500 includes an image pickup unit 310, an image pickup rate controlling unit 512, a line adding unit 514, an encoder 316, an image storing unit 318, and a picked-up image displaying unit 320.

The image pickup unit 310, the encoder 316, the image storing unit 318, and the picked-up image displaying unit 320 have substantially the same functions as the image pickup unit 310, the encoder 316, the image storing unit 318, and the picked-up image displaying unit 320 already described as constituent elements in the second embodiment, and therefore repeated description thereof will be omitted. Description in the following will be made mainly of the image pickup rate controlling unit 512 and the line adding unit 514 having new functions.

As in the second embodiment, the image pickup rate controlling unit 512 transmits an image pickup rate signal to the image pickup unit 310 to adjust an image pickup rate. The image pickup rate controlling unit 512 controls the subject image pickup rate to N/M times a normal image pickup rate, for example. In this case, unlike the second embodiment, a relation N≦M holds. Even when the image pickup rate is decreased to N/M times the normal image pickup rate, a total processing volume of data is not changed because the line adding unit 514 to be described later increases the number of lines per image to M/N times a normal number of lines.

The line adding unit 514 adds image pickup lines of the image pickup unit 310. For example, when the image pickup rate controlling unit 512 changes the image pickup rate to N/M times the normal image pickup rate, the line adding unit 514 may add image pickup lines such that the number of lines per image becomes M/N times the normal number of lines. For example, when the image pickup rate is decreased to ½ of the normal image pickup rate, the number of lines becomes twice (1080/540) the normal number of lines, that is, 540 image pickup lines are added. As a result, it is possible to obtain images of high quality while maintaining a total processing volume of data.

The image pickup apparatus 500 can increase image pickup lines and thereby improve image quality even if the image pickup apparatus 500 decreases the image pickup rate and thus performs low-speed image pickup.

A storage medium 330 on which the images are stored by the image pickup apparatus 500 described above is reproduced by an image reproducing apparatus 550 to be illustrated in the following.

(Image Reproducing Apparatus 550)

Figure 9:
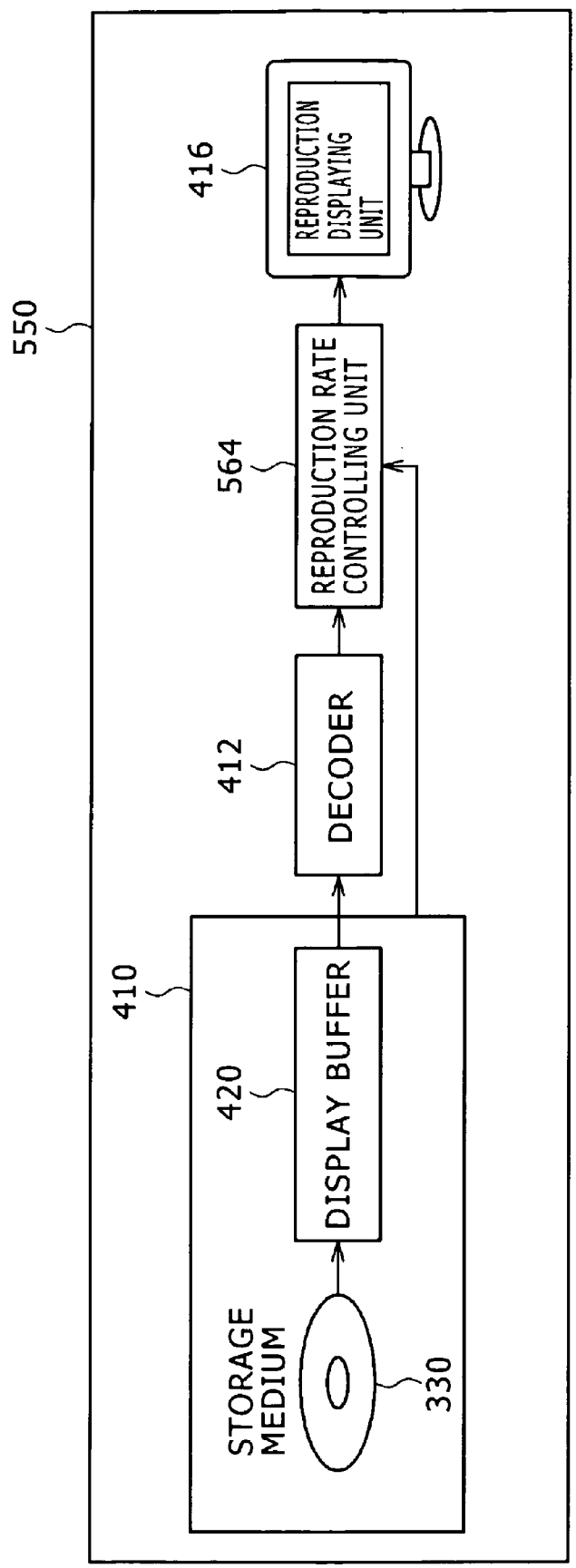
FIG. 9 is a block diagram schematically showing an image reproducing apparatus according to the third embodiment.

FIG. 9 is a block diagram schematically showing the image reproducing apparatus 550 according to the third embodiment. The image reproducing apparatus 550 includes an image reading unit 410, a decoder 412, a reproduction rate controlling unit 564, and a reproduction displaying unit 416.

The image reading unit 410, the decoder 412, and the reproduction displaying unit 416 have substantially the same functions as the image reading unit 410, the decoder 412, and the reproduction displaying unit 416 already described as constituent elements in the second embodiment, and therefore repeated description thereof will be omitted. Description in the following will be made mainly of the reproduction rate controlling unit 564 having new functions.

The reproduction rate controlling unit 564 controls a reproduction rate by interpolating an image between adjacent images of images read by the image reading unit 410 or images decompressed by the decoder 412. The above-described image pickup apparatus 500 increases the number of image pickup lines and decreases the image pickup rate, so that the number of images per unit time is smaller as compared with normal images. The reproduction rate controlling unit 564 automatically generates thus missing images. While the missing images may be generated by processing on two adjacent images by LPF, linear interpolation or the like, the missing images may be generated by simply using a duplicate of one image. Such an image generating process can be realized by various methods known conventionally, and description thereof will be omitted.

The reproduction rate controlling unit 564 may perform control to multiply the reproduction rate by M/N (N≦M). When M is an integral multiple of N, the reproduction rate controlling unit 564 can interpolate images at equal intervals between images as described above. Under such a condition, M/N is an integer L, and it suffices to interpolate L−1 images for each single image. It is therefore possible to insert L−1 images at equal intervals, and thus maintain a uniform flow of images.

FIG. 10 is a diagram of assistance in explaining the operation of the reproduction rate controlling unit 564. In this case, to facilitate understanding, a process of doubling the reproduction rate, that is, adding to one image another image is performed. However, the present embodiment is not limited to such a number of images.

On an upper side of FIG. 10, images picked up at an image pickup rate of 1/15 of a second per image (15 p) are displayed. When the images are reproduced at a normal reproduction rate of 1/30 of a second per image as they are, the images are displayed as in fast forward, which is not desirable. The reproduction rate controlling unit 564 doubles the number of such images to increase the reproduction rate to a normal reproduction rate of 1/30 of a second per image (30 p).

A method of adding an image in this case simply uses an immediately preceding image as a next image. Thus, as shown on a lower side of FIG. 10, an image 570 input to the reproduction rate controlling unit 564 is copied to generate an image 572 to be reproduced after 1/30 of a second. As a result, a reproduction of high image quality can be viewed at a desired reproduction rate. The present embodiment refers only to an immediately preceding image, but is not limited to such a case. An adjacent image or an image adjacent to the adjacent image may be used for interpolation by a conventionally known method.

(Image Processing System)

Figure 11A:
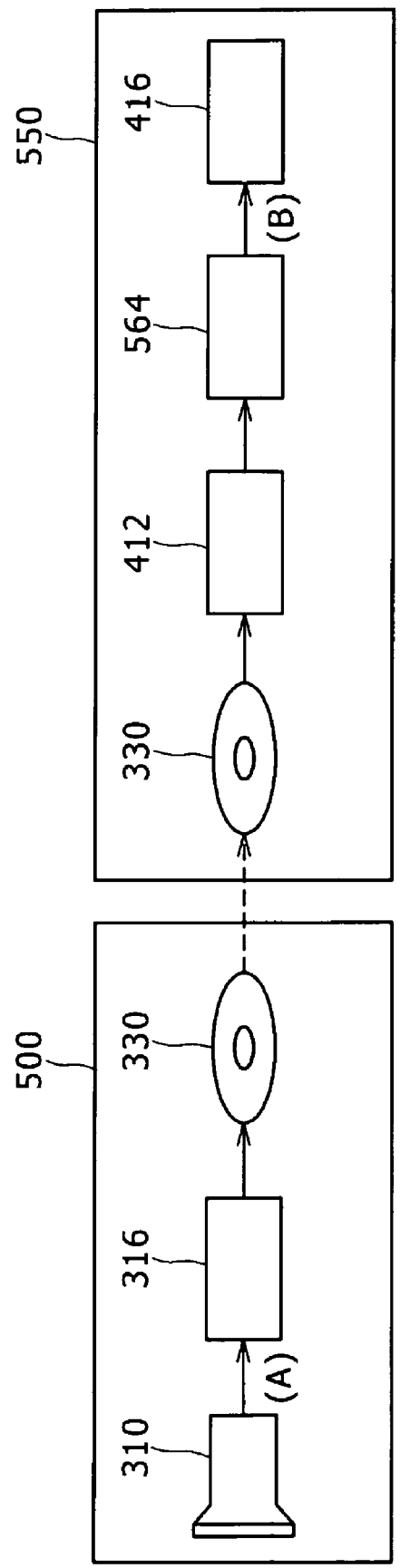
FIG. 11A is an explanatory diagram of assistance in explaining high-image-quality image pickup in the third embodiment.
Figure 11B:
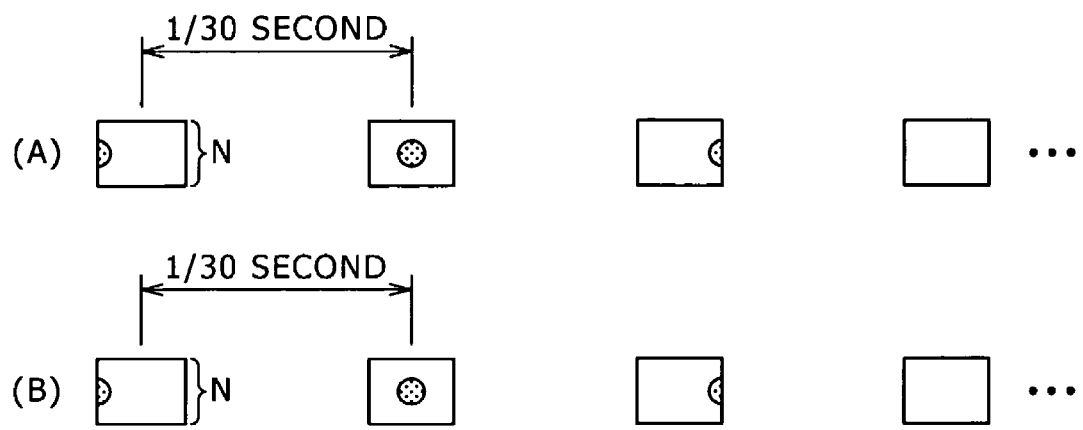
FIG. 11B is an explanatory diagram of assistance in explaining high-image-quality image pickup in the third embodiment.
Figure 11C:
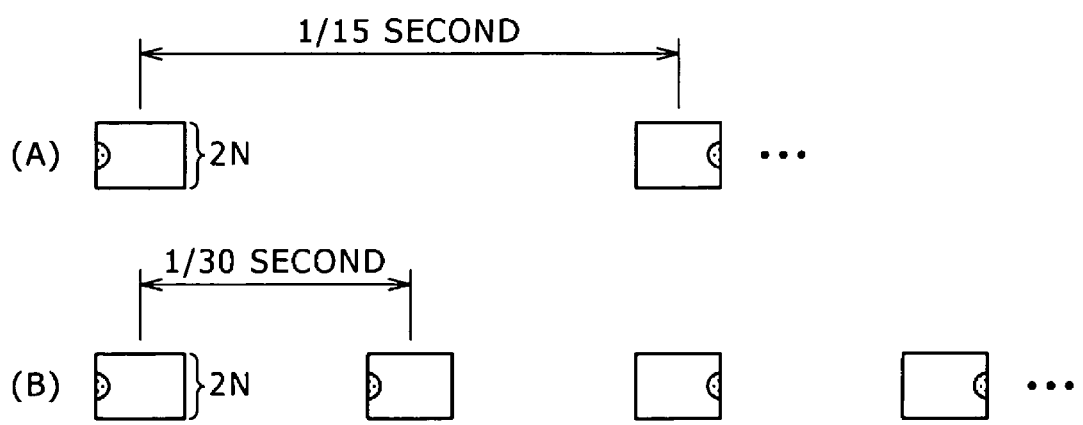
FIG. 11C is an explanatory diagram of assistance in explaining high-image-quality image pickup in the third embodiment.

FIGS. 11A, 11B, and 11C are diagrams of assistance in explaining high-image-quality image pickup in the present embodiment. FIGS. 11B and 11C, in particular, are time charts, in which a time axis extending from the left to the right of the figures represents the passage of time.

FIG. 11A is a block diagram showing the positions of check points of assistance in explaining high-image-quality image pickup. FIG. 11A shows point (A) at the image pickup unit 310 in the image pickup apparatus 500, and point (B) at the reproduction rate controlling unit 564 in the image reproducing apparatus 550. That is, an image being picked up is at point (A), and a final image whose reproduction rate is adjusted is at point (B).

FIG. 11B is a time chart of normal image pickup for comparison with high-image-quality image pickup. Such normal image pickup has already been described with reference to FIG. 7B in the second embodiment, and therefore detailed description thereof will be omitted.

FIG. 11C is a time chart in a case where high-image-quality image pickup is performed. In this case, the image pickup rate controlling unit 512 sets the image pickup rate to for example ½ of the normal image pickup rate, that is, an image pickup rate of 1/15 of a second per image. Hence, at point (A), the number of images per unit time is ½ of the number of images in FIG. 11B. Instead, the line adding unit 514 increases the number of image pickup lines twofold to 2N, so that images of high image quality can be obtained. A comparison between point (A) in FIG. 11B and point (A) in FIG. 11C indicates that while the images at point (A) in FIG. 11C are of high image quality, a total processing volume of data is the same.

Next, the reproduction rate of the images obtained by such high-image-quality image pickup is controlled, and new images are generated as at point (B) in FIG. 11C, whereby the number of images is increased twofold. Thus, the image reproducing apparatus 550 can reproduce images which are each of high image quality though image transitions are somewhat reduced.

Fourth Embodiment

Image Pickup Apparatus

An image pickup apparatus according to a fourth embodiment is obtained by adding further functions to constituent elements of the image pickup apparatus 300 described in the second embodiment. The image pickup apparatus according to the fourth embodiment therefore has the same functions as the image pickup apparatus 300 except for the new functions to be illustrated below.

An image pickup rate controlling unit 312 in the present embodiment has not only a function of simply adjusting the image pickup rate of an image pickup unit 310 but also a function of changing the image pickup rate stepwise (gradually). Thus, the image pickup rate controlling unit 312 increases the subject image pickup rate stepwise from 1/30 of a second per image to 1/31 of a second per image, to 1/32 of a second per image, . . . to 1/60 of a second per image, for example. It is thereby possible to view images that make a smooth transition to slow motion at a time of reproduction. Such an increase in the image pickup rate may be a linear, simple increase, or may be an increase based on an arbitrary function.

FIG. 12 is a time chart of assistance in explaining image pickup when the image pickup rate is increased stepwise as described above. The passage of time in the time chart is represented by a time axis extending from the left to the right of the figure. In the figure, N denotes the number of lines.

In FIG. 12, a transition is made from normal image pickup that captures an image of a subject every 1/30 of a second to finally high-speed image pickup that captures an image of a subject every 1/60 of a second while the image pickup rate is increased stepwise. Hence, when such images are reproduced, a stepwise (gradual) change is made from the normal reproduction rate to slow motion. When an image of a flying ball having a highly dynamic characteristic is picked up, for example, a large change in the position of the ball is observed between images 600 of adjacent frames at first, and when subsequent images are viewed, the change in the position of the ball is observed to become smaller gradually.

Thus, the image pickup rate controlling unit 312 can change the image pickup rate stepwise to N/M (N≧M, and N and M are an integer) times the normal image pickup rate.

At this time, an image storing unit 318 may store numerical information of N and M on a storage medium 330 together with the images each time the image pickup rate is changed. Since the numerical values are changed in real time during image pickup, the image storing unit 318 stores new numerical information on the storage medium 330 in timing of each conversion of the numerical values. For example, in the case of FIG. 12, (N, M)=(30, 30), (31, 30), (32, 30) . . . (59, 30), and (60, 30).

A line reducing unit 314 in the present embodiment may operate only when a compression processing volume in an encoder 316 exceeds a predetermined value. When there is a limit to the compression processing of the encoder 316, an upper limit of a total processing volume of data in the image pickup apparatus 300 can be determined by the encoder 316. In the present embodiment, image quality must be lowered as the image pickup rate is increased. However, with the line reducing unit 314 operating only when the compression processing volume in the encoder 316 exceeds the predetermined value, it is possible to only increase the image pickup rate without lowering image quality until the upper limit of the total processing volume of data is reached, and thus make full use of the capacity of the encoder 316. Such a limitation of hardware resources may be imposed by the frequency band of an image transfer path or the capacity of the storage medium.

Figure 13:
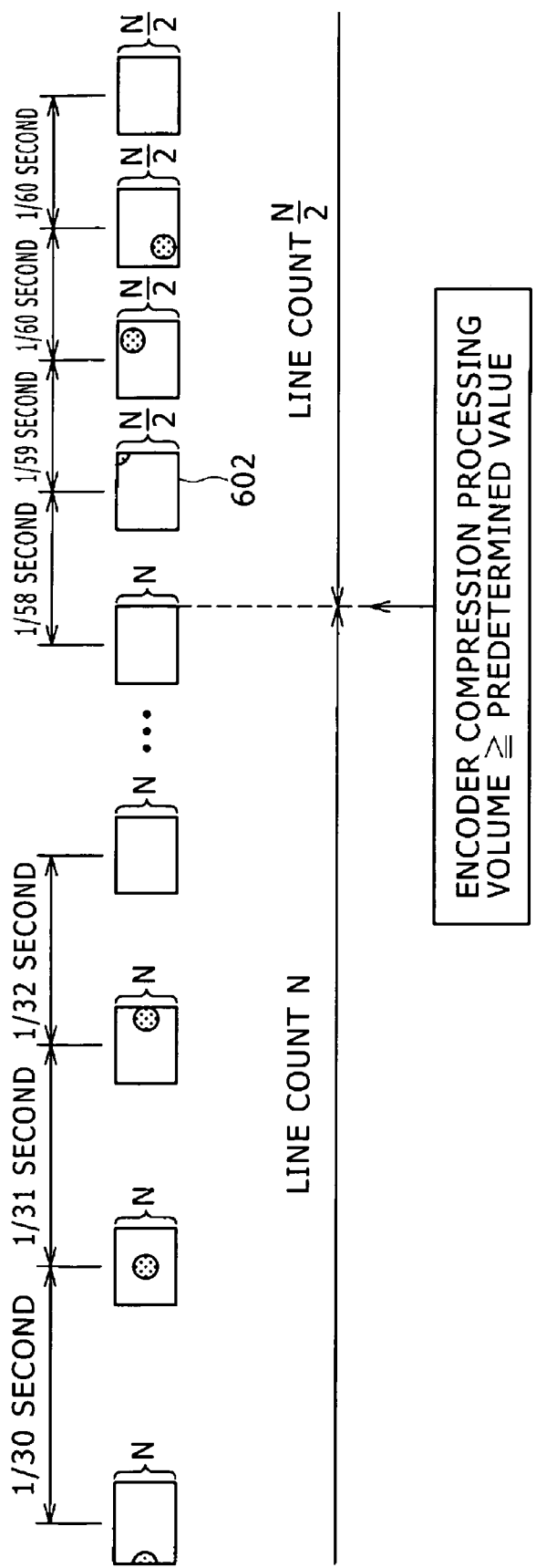
FIG. 13 is a time chart of assistance in explaining image pickup when a total processing volume in an encoder exceeds a predetermined value set as a threshold value.

FIG. 13 is a time chart of assistance in explaining image pickup when the total processing volume in the encoder exceeds a predetermined value set as a threshold value. The passage of time in the time chart is represented by a time axis extending from the left to the right of the figure.

In FIG. 13, as in FIG. 12, a transition is made from normal image pickup that captures an image of a subject every 1/30 of a second to finally high-speed image pickup that captures an image of a subject every 1/60 of a second while the image pickup rate is increased stepwise. When the image pickup rate becomes 58/30 times the normal image pickup rate, the line reducing unit 314 determines that the compression processing volume in the encoder 316 exceeds the predetermined value, and reduces the number of lines to ½. Hence, all of an image 602 and subsequent images have N/2 lines.

The image pickup rate controlling unit 312 can increase and decrease the image pickup rate stepwise. For example, while the image pickup rate is decreased, when the line reducing unit 314 determines that the compression processing volume in the encoder 316 does not exceed the predetermined value even if the number of lines is changed back to N, the line reducing unit 314 can stop line reduction and set the number of lines back to the normal number of lines of N.

Fifth Embodiment

Image Pickup Apparatus

An image pickup apparatus according to a fifth embodiment is obtained by adding further functions to constituent elements of the image pickup apparatus 500 described in the third embodiment. The image pickup apparatus according to the fifth embodiment therefore has the same functions as the image pickup apparatus 500 except for the new functions to be illustrated below.

A line adding unit 514 in the present embodiment has not only a function of simply adding image pickup lines of an image pickup unit 310 but also a function of changing the number of image pickup lines to be added stepwise. Thus, the line adding unit 514 gradually increases the number of image pickup lines for a subject from 540 to 675, 710, 945, and 1080 in this order, for example. It is thereby possible to view images that are smoothly increased in image quality at a time of reproduction.

Figure 14:
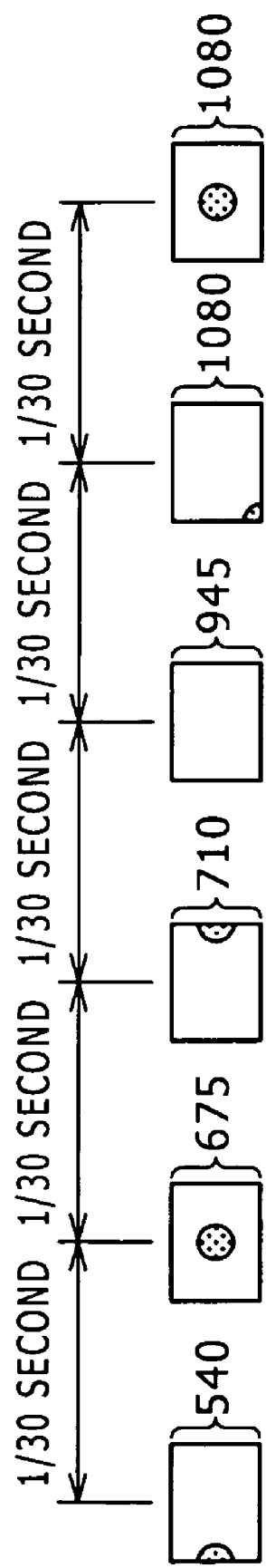
FIG. 14 is a time chart of assistance in explaining image pickup when image pickup lines are increased gradually.

FIG. 14 is a time chart of assistance in explaining image pickup when the image pickup lines are increased stepwise as described above. The passage of time in the time chart is represented by a time axis extending from the left to the right of the figure. In the figure, a number shown on a right side of an image indicates the number of lines of the image.

All images in FIG. 14 are picked up by normal image pickup that captures an image of a subject every 1/30 of a second. In FIG. 14, the number of lines is increased stepwise from 540 to 675, 710, 945, and 1080 in this order, and thus image quality is gradually heightened. Hence, when such images are reproduced, it is possible to view an image that becomes gradually clearer and sharper with the passage of time. Such an increase in the number of lines may be a linear, simple increase, or may be an increase based on an arbitrary function.

Thus, the line adding unit 514 can increase the number of image pickup lines to M1N (N≦M, and N and M are an integer) times the normal number of lines.

At this time, an image storing unit 318 may store numerical information of N and M on a storage medium 330 together with the images each time the number of lines is changed. Since the numerical values are changed in real time during image pickup, the image storing unit 318 stores new numerical information on the storage medium 330 in timing of each conversion of the numerical values. For example, in the case of FIG. 14, (N, M)=(540, 540), (675, 540), (710, 540) . . . (945, 540), and (1080, 540).

An image pickup rate controlling unit 512 in the present embodiment may operate only when a compression processing volume in an encoder 316 exceeds a predetermined value. When there is a limit to the compression processing of the encoder 316, an upper limit of a total processing volume of data in the image pickup apparatus 500 can be determined by the encoder 316. In the present embodiment, the image pickup rate must be lowered as image quality is heightened.

However, with the image pickup rate controlling unit 512 operating only when the compression processing volume in the encoder 316 exceeds the predetermined value, it is possible to only heighten image quality without lowering the image pickup rate until the upper limit of the total processing volume of data is reached, and thus make full use of the capacity of the encoder 316. Such a limitation of hardware resources may be imposed by the frequency band of an image transfer path or the capacity of the storage medium.

Figure 15:
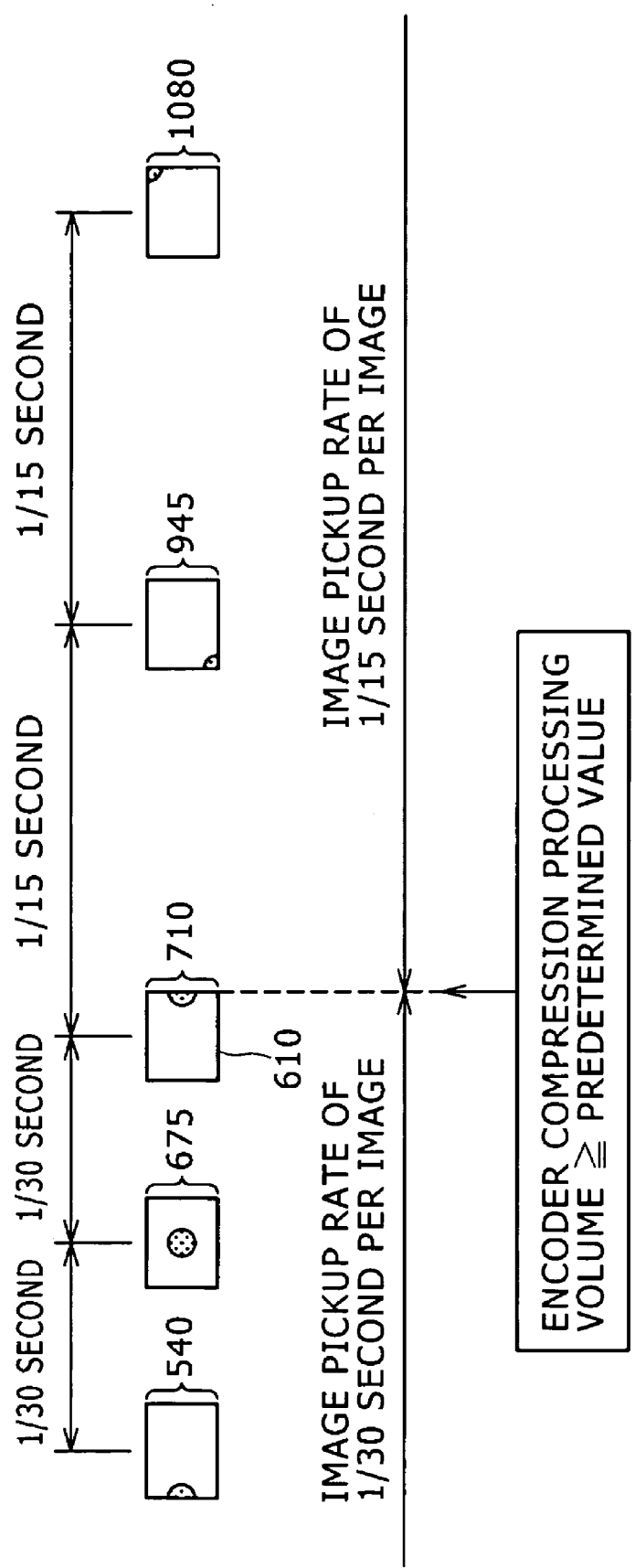
FIG. 15 is a time chart of assistance in explaining image pickup when a total processing volume in an encoder exceeds a predetermined value set as a threshold value.

FIG. 15 is a time chart of assistance in explaining image pickup when the total processing volume in the encoder exceeds a predetermined value set as a threshold value. The passage of time in the time chart is represented by a time axis extending from the left to the right of the figure.

In FIG. 15, as in FIG. 14, the number of lines during image pickup is increased stepwise from 540, and is finally changed to 1080. When the number of image pickup lines becomes 710, the image pickup rate controlling unit 512 determines that the compression processing volume in the encoder 316 exceeds the predetermined value, and changes the image pickup rate to ½ (1/15 of a second per image). Hence, all of an image 610 and subsequent images are picked up at an image pickup rate of 1/15 of a second per image.

The line adding unit 514 can increase and decrease the image pickup lines stepwise. For example, while the image pickup lines are decreased, when the image pickup rate controlling unit 512 determines that the compression processing volume in the encoder 316 does not exceed the predetermined value even if the image pickup rate is changed back to 1/30 of a second per image, the image pickup rate controlling unit 512 can stop changing the image pickup rate and set the image pickup rate back to the normal image pickup rate of 1/30 of a second per image.

Sixth Embodiment

Image Reproducing Apparatus

An image reproducing apparatus according to a sixth embodiment is obtained by adding further functions to constituent elements of the image reproducing apparatus 400 described in the second embodiment. The image reproducing apparatus according to the sixth embodiment therefore has the same functions as the image reproducing apparatus 400 except for the new functions to be illustrated below.

Figure 16:
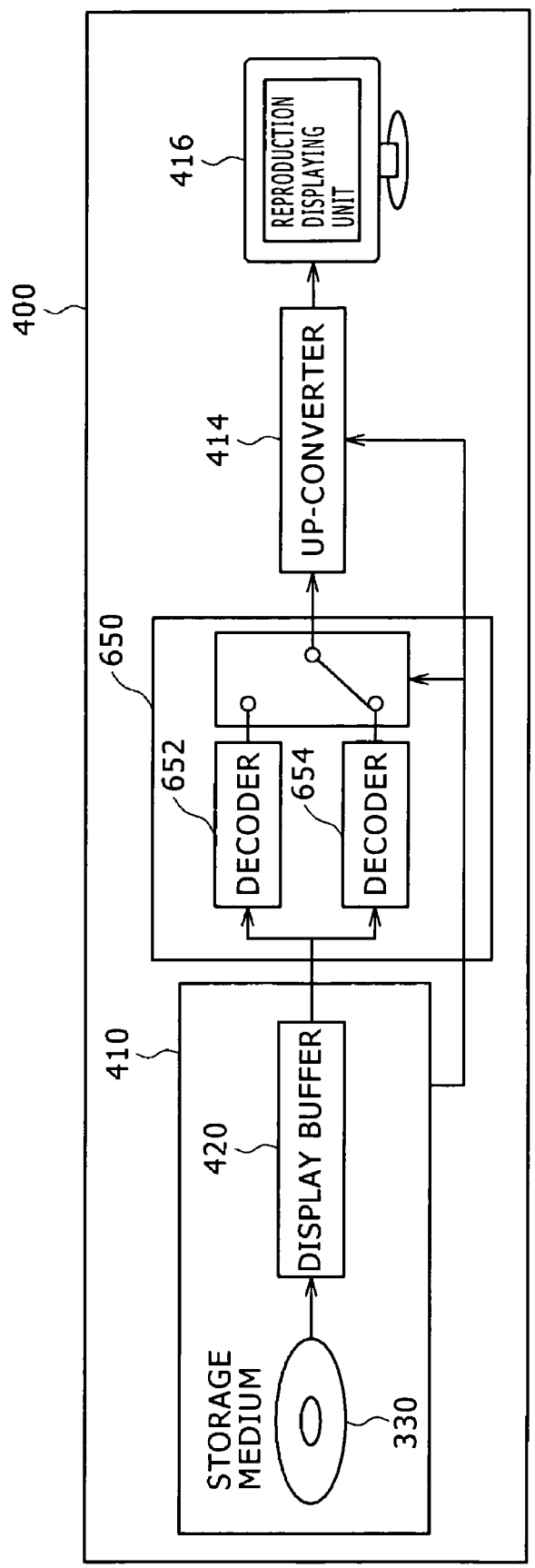
FIG. 16 is a block diagram schematically showing an image reproducing apparatus according to a sixth embodiment.

FIG. 16 is a block diagram schematically showing the image reproducing apparatus according to the sixth embodiment. A decoder 650 in the present embodiment includes two decoders 652 and 654 that can process different numbers of lines. The two decoders 652 and 654 decompress compressed images with respective numbers of lines that can be processed. Outputs from the two decoders 652 and 654 to an up-converter 414 may be selected according to numerical information of N and M read together with images from a storage medium 330 in an image reading unit 410.

Such a decoder 650 may not be ready for images that change in the number of lines during reproduction. The decoders 652 and 654 ready for the respective numbers of lines to which the number of lines can be changed are provided. For example, the decoder 652 is ready for an image with 540 lines, and the decoder 654 is ready for an image with 1080 lines. The decoders 652 and 654 each perform decompression processing at all times, and the outputs of the decoders 652 and 654 are selected according to information on the number of lines which information is read from the storage medium 330. For example, when the number of lines of an image is 1080, the decoder 654 is selected. Thus, a stable output can be obtained regardless of change in the number of lines.

Combined with the above-described image processing system, an image pickup method and an image reproducing method according to a seventh embodiment will be described below in a case (1) where high-speed image pickup is achieved though image quality is somewhat sacrificed, and an image pickup method and an image reproducing method according to an eighth embodiment will be described below in a case (2) where images of high image quality are obtained in low-speed image pickup.

Seventh Embodiment

Image Pickup Method and Image Reproducing Method

Image Pickup Method

Detailed description will next be made of an image pickup method for picking up high-speed images using the above-described image pickup apparatus 300.

Figure 17:
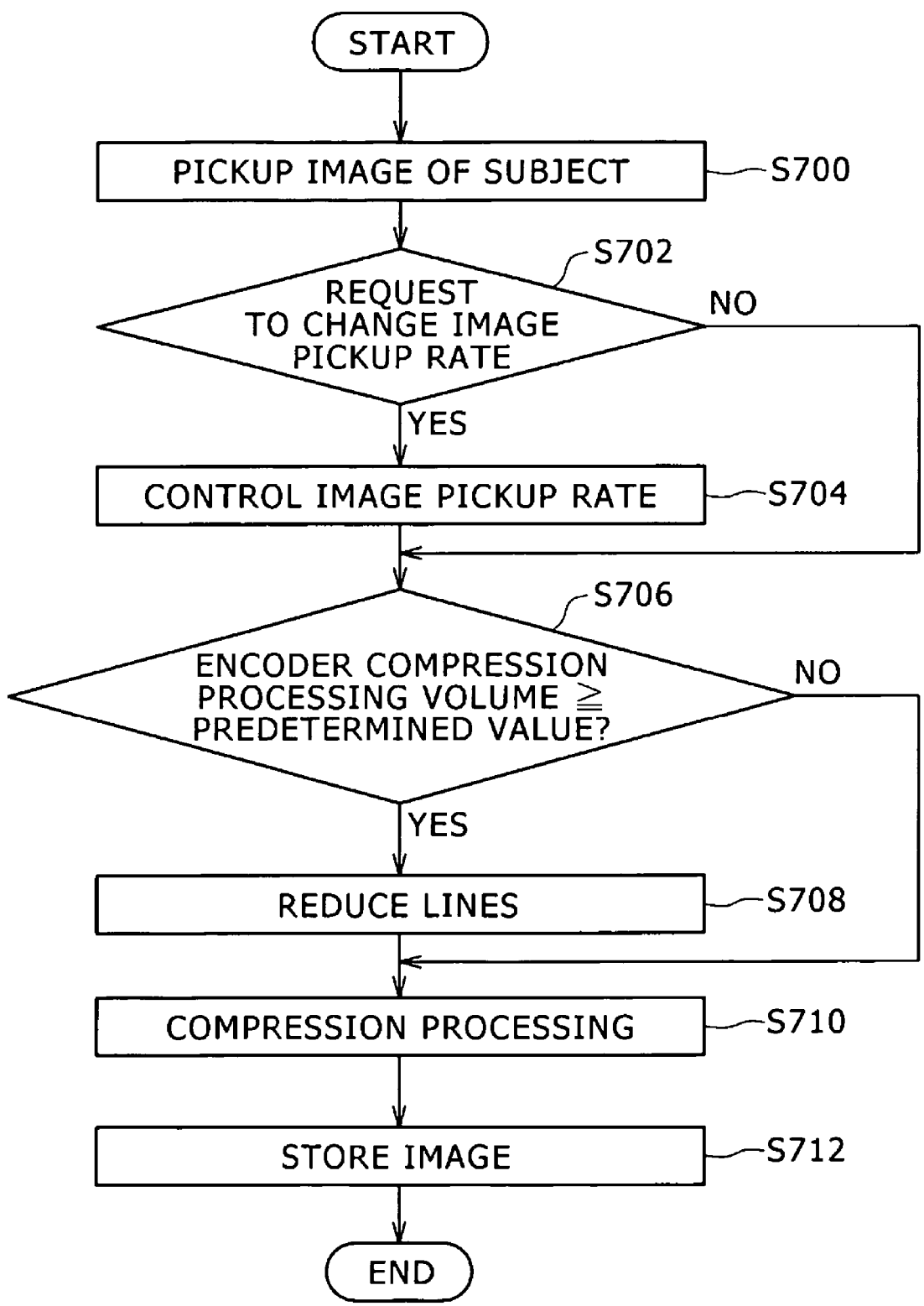
FIG. 17 is a flowchart showing a flow of an image pickup method according to a seventh embodiment.

FIG. 17 is a flowchart showing a flow of the image pickup method in the present embodiment. The flowchart illustrates how the image pickup apparatus 300 performs high-speed image pickup.

First, an image of a subject is obtained by using the image pickup unit 310 of the image pickup apparatus 300 (S700). As described above, the image pickup unit 310 includes a lens part, a prism part, and a CCD part. Then, whether a request to change the image pickup rate, that is, to perform high-speed image pickup is received from a user is checked (S702). When there is a request to change the image pickup rate, the image pickup rate in the image pickup step (S700) is controlled (S704). When there is no request to change the image pickup rate, the processing proceeds to a next process.

Next, a processing volume per unit time is estimated by an evaluation unit 315 by obtaining a product of the changed image pickup rate and the number of lines in one image, and whether or not a compression processing volume in the encoder 316 exceeds a predetermined value is determined (S706). When the compression processing volume in the encoder 316 exceeds the predetermined value, a plurality of lines are removed from the picked-up image (S708). When the compression processing volume in the encoder 316 does not exceed the predetermined value, such line reduction is not performed.

The image thus obtained is compressed by the encoder 316 (S710), and then stored on a storage medium such as an optical disk or the like in the image storing unit 318 (S712). (Image Reproducing Method)

Detailed description will next be made of an image reproducing method for reproducing high-speed images using the above-described image reproducing apparatus 400.

Figure 18:
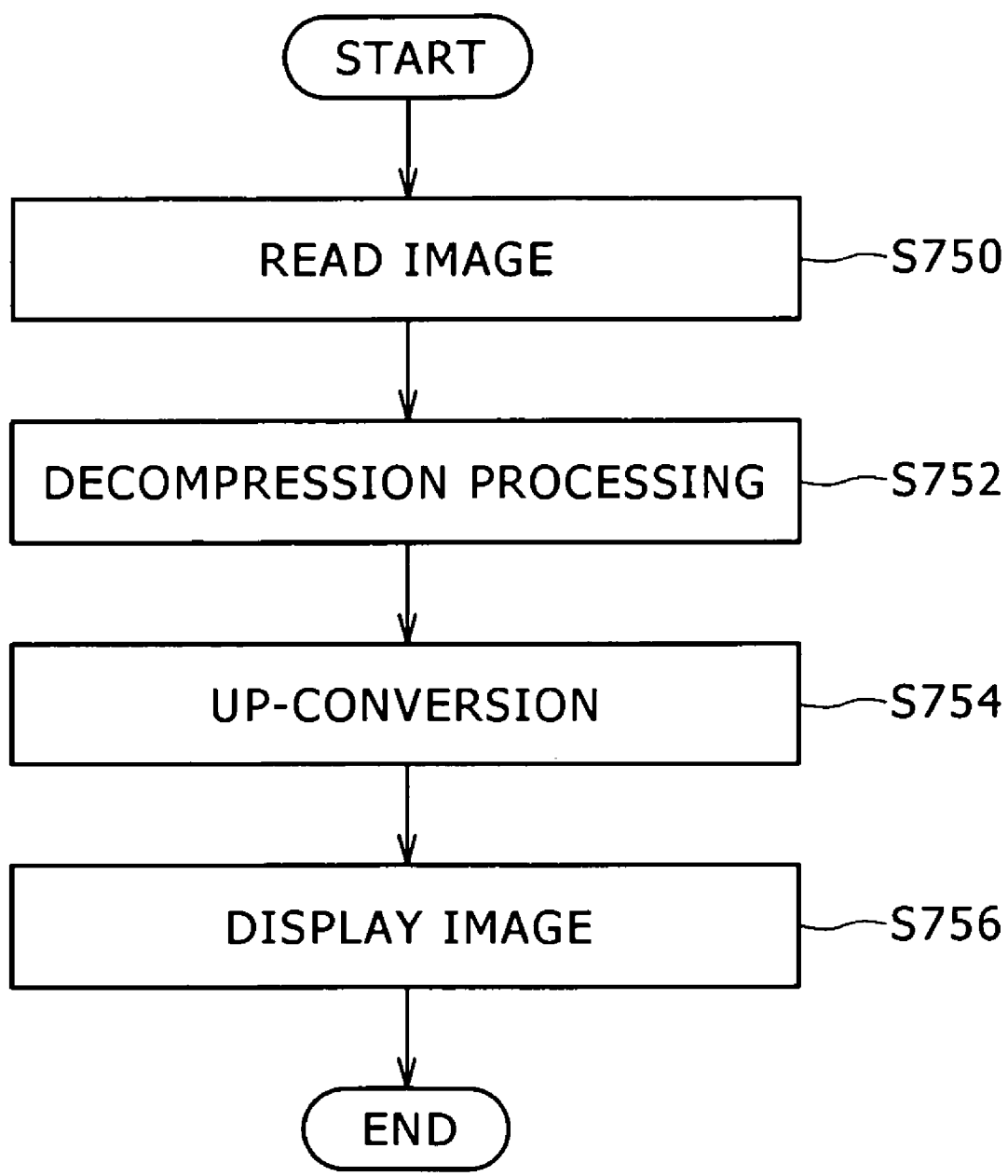
FIG. 18 is a flowchart showing a flow of an image reproducing method according to the seventh embodiment.

FIG. 18 is a flowchart showing a flow of the image reproducing method in the present embodiment. The flowchart illustrates how the image reproducing apparatus 400 reproduces images picked up by high-speed image pickup.

First, the image reading unit 410 of the image reproducing apparatus 400 reads an image stored on the storage medium written by the image pickup apparatus 300 (S750). When the read image is compressed, the decoder 412 decompresses the image (S752). Next, the up-converter 414 up-converts the decompressed image, thereby generating a final image (S754). The image is displayed on the reproduction displaying unit 416 (S756).

According to the image pickup method and the image reproducing method described above, high-speed image pickup can be achieved though image quality is somewhat sacrificed.

Eighth Embodiment

Image Pickup Method and Image Reproducing Method

Image Pickup Method

Detailed description will next be made of an image pickup method for picking up high-image-quality images using the above-described image pickup apparatus 500.

Figure 19:
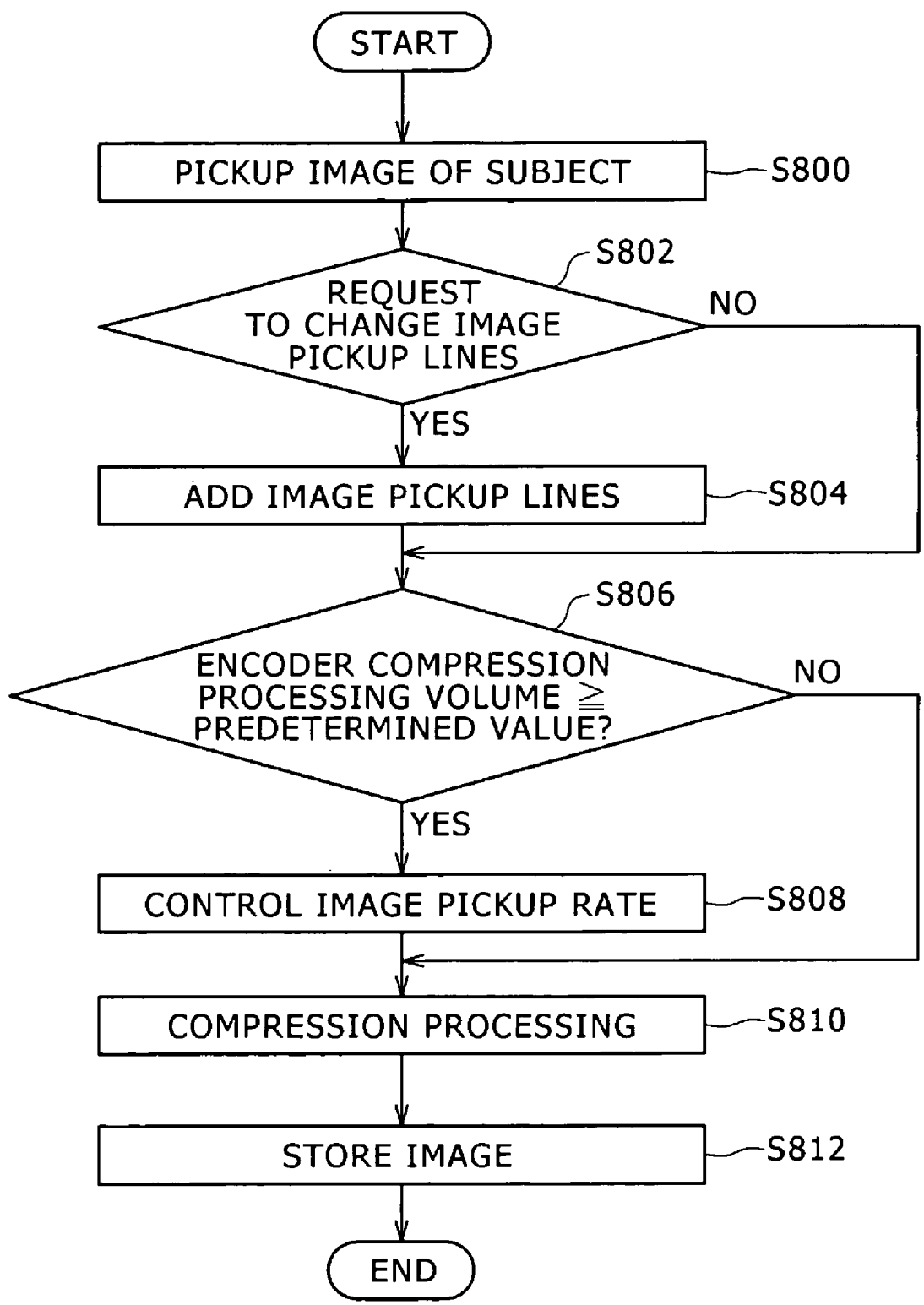
FIG. 19 is a flowchart showing a flow of an image pickup method according to an eighth embodiment.

FIG. 19 is a flowchart showing a flow of the image pickup method in the present embodiment. The flowchart illustrates how the image pickup apparatus 500 performs high-image-quality image pickup.

First, an image of a subject is obtained by using the image pickup unit 310 of the image pickup apparatus 500 (S800). Then, whether or not a request to change image pickup lines, that is, to perform high-image-quality image pickup is received from a user is checked (S802). When there is a request to change the image pickup lines, image pickup lines are added to the image pickup lines in the image pickup step (S800) (S804). When there is no request to change the image pickup lines, the processing proceeds to a next process.

Next, a processing volume per unit time is estimated by obtaining a product of the image pickup rate and the changed number of lines in one image, and whether a compression processing volume in the encoder 316 exceeds a predetermined value is determined (S806). When the compression processing volume in the encoder 316 exceeds the predetermined value, the image pickup rate in the image pickup step (S800) is controlled (S808). When the compression processing volume in the encoder 316 does not exceed the predetermined value, such control of the image pickup rate is not performed.

The image thus obtained is compressed by the encoder 316 (S810), and then stored on a storage medium such as an optical disk or the like in the image storing unit 318 (S812).
(Image Reproducing Method)

Detailed description will next be made of an image reproducing method for reproducing high-speed images using the above-described image reproducing apparatus 550.

Figure 20:
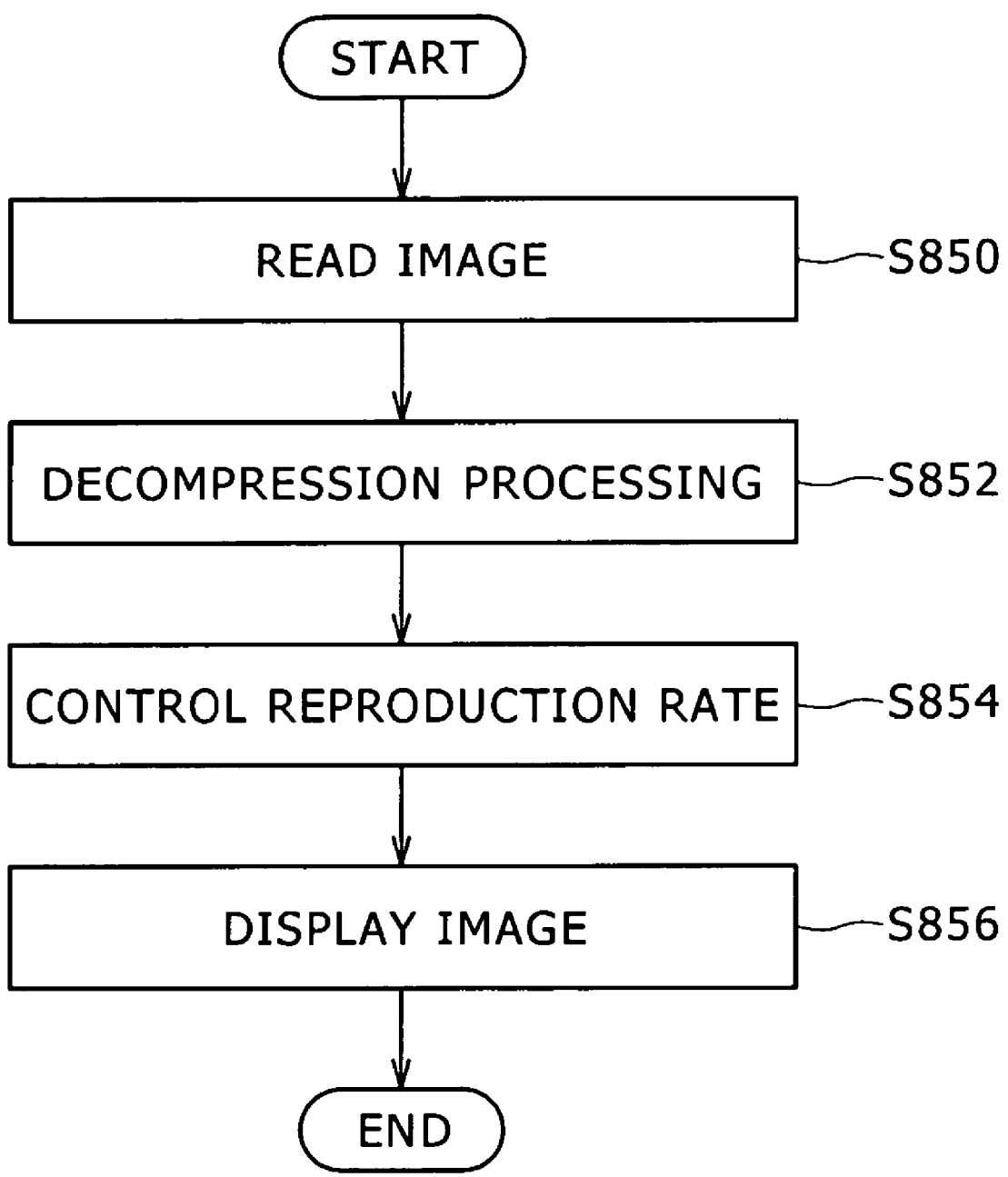
FIG. 20 is a flowchart showing a flow of an image reproducing method according to the eighth embodiment.

FIG. 20 is a flowchart showing a flow of the image reproducing method in the present embodiment. The flowchart illustrates how the image reproducing apparatus 550 reproduces images picked up by high-speed image pickup.

First, the image reading unit 410 of the image reproducing apparatus 550 reads an image stored on the storage medium written by the image pickup apparatus 300 (S850). When the read image is compressed, the decoder 412 decompresses the image (S852). Next, the reproduction rate controlling unit 564 controls the reproduction rate of the decompressed image, thereby generating a final image (S854). The image is displayed on the reproduction displaying unit 416 (S856).

According to the image pickup method and the image reproducing method described above, images of high image quality are obtained in low-speed image pickup.

Steps in the image pickup methods and the image reproducing methods do not necessarily need to be performed in time series in the order described in the flowcharts, and may include processes carried out in parallel or individually (for example parallel processing or processing based on an object).

While preferred embodiments of the present invention have been described above with reference to the accompanying drawings, it is needless to say that the present invention is not limited to such examples. It is obvious that various changes or modifications within the scope described in claims will occur to those skilled in the art, and it is therefore naturally understood that they fall within the technical scope of the present invention.

For example, while the foregoing embodiments have been described on the basis of storage of images on a storage medium in the form of a disk in a disk unit, the present invention is not limited to such a case, and other storage media such as storages, HDDs and the like can be used.

In addition, while the foregoing embodiment has been described by taking an example of stepwise transition from $\frac{1}{30}$ of a second per image (30 p) to $\frac{1}{60}$ of a second per image (60 p), it is possible to perform image pickup that makes a stepwise transition in a reverse direction.

In addition, while the image pickup apparatus in the foregoing embodiments add or reduce horizontal lines, the image pickup apparatus can be configured to reduce pixels or lines in a vertical direction.

Further, while in the foregoing embodiments, the image pickup apparatus and the image reproducing apparatus are described separately, the image pickup apparatus and the image reproducing apparatus can be formed integrally. In addition, the image pickup apparatus intended for high-speed image pickup and the image pickup apparatus intended for high-image-quality image pickup can be formed integrally. For example, an image pickup apparatus having the functions of both the image pickup apparatus intended for high-speed image pickup and the image pickup apparatus intended for high-image-quality image pickup can be realized by adding the line adding unit 514 in the image pickup apparatus 500 to the image pickup apparatus 300. Similarly, the image reproducing apparatus can be formed integrally.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing system comprising:
   an image pickup apparatus for picking up an image of a subject; and
   an image reproducing apparatus for reproducing the image picked up by said image pickup apparatus; wherein said image pickup apparatus includes
      an image pickup unit for obtaining an image by image pickup, an image pickup rate controlling unit for controlling an image pickup rate of said image pickup unit,
      a line reducing unit for removing a plurality of lines from said image obtained by the image pickup to generate a reduced image,
      an image storing unit for storing the reduced image on a storage medium, and
      an evaluation unit for determining a compression processing volume for compressing data of an image sequence by an encoder based on a product between a number of lines that remain in the reduced image and the image pickup rate, and
   said image reproducing apparatus includes
      an image reading unit for reading the image stored on said storage medium,
      an up-converter for up-converting the read said image, and a reproduction displaying unit for displaying said up-converted image, wherein in a case where the evaluation unit determines that the compression processing volume does not exceed a predetermined threshold, the line reducing unit is instructed not to remove the plurality of lines from the image, and in a case where the evaluation unit determines that the compression processing volume exceeds the predetermined threshold, the line reducing unit is instructed to remove at least some of the plurality of lines from the image.

2. An image pickup apparatus comprising:

an image pickup unit for obtaining an image by image pickup;

an image pickup rate controlling unit for controlling an image pickup rate of said image pickup unit;

a line reducing unit for removing a plurality of lines from said image obtained by the image pickup unit to generate a reduced image;

an image storing unit for storing the reduced image on a storage medium; and an evaluation unit for determining a compression processing volume for compressing data of an image sequence by an encoder based on a product between a number of lines that remain in the reduced image and the image pickup rate, wherein in a case where the evaluation unit determines that the compression processing volume does not exceed a predetermined threshold, the line reducing unit is instructed not to remove the plurality of lines from the image, and in a case where the evaluation unit determines that the compression processing volume exceeds the predetermined threshold, the line reducing unit is instructed to remove at least some of the plurality of lines from the image.

3. The image pickup apparatus as claimed in claim 2, wherein said image pickup rate controlling unit controls the image pickup rate to N/M (where N is greater than or equal to M, and N and M are integers) times a normal image pickup rate, and said line reducing unit removes the lines such that a number of lines per image is M/N times a normal number of lines.

4. The image pickup apparatus as claimed in claim 3, wherein when said N is an integral multiple of M, said line reducing unit discretely reduces said lines at equal intervals.

5. The image pickup apparatus as claimed in claim 3, wherein said image storing unit stores numerical information of N and M on the storage medium together with said reduced image.

6. The image pickup apparatus as claimed in claim 2, further comprising an encoder for compressing the reduced image in which said plurality of lines are removed, wherein said image storing unit stores said compressed image on the storage medium.

7. The image pickup apparatus as claimed in claim 2, wherein said storage medium is in a form of a disk, and said image storing unit includes a disk buffer for temporarily retaining said reduced image and outputting said reduced image in timing of access to said storage medium.

8. An image pickup method comprising the steps of:

obtaining an image by an image pickup operation;

controlling an image pickup rate used in said image pickup operation;

removing a line from a plurality of lines from said image obtained by the image pickup operation to generate a reduced image;

storing the reduced image on a storage medium; and evaluating a compression processing volume for compressing data of an image sequence by an encoder based on a product between a number of lines that remain in the reduced image and the image pickup rate, wherein in a case where said step of evaluating determines that the compression processing volume does not exceed a predetermined threshold, said step of removing the line does not remove any of the plurality of lines from the image, and in a case where said step of evaluating determines that the compression processing volume exceeds the predetermined threshold, the step of removing the line removes at least some of the plurality of lines from the image.

\* \* \* \* \*